(12) United States Patent
Friedlander et al.

(10) Patent No.: US 7,930,262 B2
(45) Date of Patent: Apr. 19, 2011

(54) SYSTEM AND METHOD FOR THE LONGITUDINAL ANALYSIS OF EDUCATION OUTCOMES USING COHORT LIFE CYCLES, CLUSTER ANALYTICS-BASED COHORT ANALYSIS, AND PROBABILISTIC DATA SCHEMAS

(75) Inventors: Robert R. Friedlander, Southbury, CT (US); Jay A. Goodwyn, Orchard Park, NY (US); James R. Kraemer, Santa Fe, NM (US); Anthony W. Young, Sicklerville, NJ (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 11/874,382

(22) Filed: Oct. 18, 2007

(65) Prior Publication Data
US 2009/0106179 A1   Apr. 23, 2009

(51) Int. Cl.
G06N 5/02 (2006.01)
G06F 17/30 (2006.01)

(52) U.S. Cl. .......................................... 706/45; 706/62
(58) Field of Classification Search .................. None
See application file for complete search history.

(56) References Cited

U.S. PATENT DOCUMENTS

| | | | |
|---|---|---|---|
| 4,328,978 A | 5/1982 | McLaughlin | |
| 4,551,842 A | 11/1985 | Segarra | |
| 4,841,526 A | 6/1989 | Wilson et al. | |
| 4,890,227 A | 12/1989 | Watanabe et al. | |
| 5,070,453 A | 12/1991 | Duffany | |
| 5,128,871 A | 7/1992 | Schmitz | |
| 5,237,429 A | 8/1993 | Zuiss et al. | |
| 5,406,626 A | 4/1995 | Ryan | |
| 5,455,868 A | 10/1995 | Sergent et al. | |
| 5,491,838 A | 2/1996 | Takahisa et al. | |
| 5,524,051 A | 6/1996 | Ryan | |

(Continued)

FOREIGN PATENT DOCUMENTS

EP   0772367   5/1997

(Continued)

OTHER PUBLICATIONS

Judith M. Harackiewicz, Kenneth E. Barron, Andrew J. Elliot, John M. Tauer, and Suzanne M. Carter Short-Term and Long-Term Consequences of Achievement Goals: Predicting Interest and Performance Over Time 2000 Journal of Educational Payehology Copyright 2000 by the American Psychological Association, Inc. vol. 92, No. 2, 316-330.*

(Continued)

*Primary Examiner* — Neveen Abel-Jalil
*Assistant Examiner* — Polina Peach
(74) *Attorney, Agent, or Firm* — Yee & Associates, P.C.; John R. Pivnichny

(57) ABSTRACT

A computer implemented method, computer program product, and data processing system for performing analysis on a plurality of data stored in a database. In an illustrative method, a first cohort is generated from the plurality of data. An optimal control cohort is generated from the plurality of data. Generating is performed based on the first cohort and at least one constraint, and a mathematical process is used to derive the optimal control cohort. A first inference is generated based on a comparison of the first cohort to the optimal control cohort, wherein the first inference is absent from the database. In an illustrative example, the first inference is stored.

17 Claims, 10 Drawing Sheets

U.S. PATENT DOCUMENTS

| | | |
|---|---|---|
| 5,550,021 A | 8/1996 | Blum et al. |
| 5,577,266 A | 11/1996 | Takahisa et al. |
| 5,590,195 A | 12/1996 | Ryan |
| 5,613,194 A | 3/1997 | Olds et al. |
| 5,642,397 A | 6/1997 | Agbaje-Anozie |
| 5,659,596 A | 8/1997 | Dunn |
| 5,692,446 A | 12/1997 | Becker et al. |
| 5,692,501 A | 12/1997 | Minturn |
| 5,745,532 A | 4/1998 | Campana, Jr. |
| 5,751,806 A | 5/1998 | Ryan |
| 5,764,740 A | 6/1998 | Holender |
| 5,781,704 A | 7/1998 | Rossmo |
| 5,809,472 A | 9/1998 | Morrison |
| 5,815,971 A | 10/1998 | Rothe et al. |
| 5,825,755 A | 10/1998 | Thompson et al. |
| 5,838,918 A | 11/1998 | Prager et al. |
| 5,880,598 A | 3/1999 | Duong |
| 5,889,474 A | 3/1999 | LaDue |
| 5,926,624 A | 7/1999 | Katz et al. |
| 5,930,350 A | 7/1999 | Johnson |
| 5,965,352 A | 10/1999 | Stoughton et al. |
| 5,974,312 A | 10/1999 | Hayes, Jr. et al. |
| 5,982,281 A | 11/1999 | Layson, Jr. |
| 6,021,403 A | 2/2000 | Horvitz et al. |
| 6,058,391 A | 5/2000 | Gardner |
| 6,076,166 A | 6/2000 | Moshfeghi et al. |
| 6,167,405 A | 12/2000 | Rosensteel, Jr. et al. |
| 6,189,004 B1 | 2/2001 | Rassen et al. |
| 6,192,340 B1 | 2/2001 | Abecassis |
| 6,212,524 B1 | 4/2001 | Weissman et al. |
| 6,216,134 B1 | 4/2001 | Heckerman et al. |
| 6,260,036 B1* | 7/2001 | Almasi et al. ............... 707/688 |
| 6,269,365 B1 | 7/2001 | Kiyoki et al. |
| 6,278,999 B1 | 8/2001 | Knapp |
| 6,285,886 B1 | 9/2001 | Kamel et al. |
| 6,321,207 B1 | 11/2001 | Ye |
| 6,353,818 B1 | 3/2002 | Carino, Jr. |
| 6,370,931 B2 | 4/2002 | Bennett |
| 6,377,993 B1 | 4/2002 | Brandt et al. |
| 6,385,604 B1 | 5/2002 | Bakalash et al. |
| 6,484,155 B1 | 11/2002 | Kiss et al. |
| 6,506,384 B1 | 1/2003 | Laal et al. |
| 6,509,898 B2 | 1/2003 | Chi et al. |
| 6,563,804 B1 | 5/2003 | Iyer et al. |
| 6,578,043 B2 | 6/2003 | Nye |
| 6,581,037 B1 | 6/2003 | Pak |
| 6,606,625 B1 | 8/2003 | Muslea et al. |
| 6,611,822 B1* | 8/2003 | Beams et al. ............... 706/11 |
| 6,629,106 B1 | 9/2003 | Narayanaswamy et al. |
| 6,662,141 B2 | 12/2003 | Kaub |
| 6,675,159 B1* | 1/2004 | Lin et al. ............... 1/1 |
| 6,714,979 B1 | 3/2004 | Brandt et al. |
| 6,823,818 B2 | 11/2004 | van den Berg et al. |
| 6,826,568 B2 | 11/2004 | Bernstein et al. |
| 6,829,604 B1 | 12/2004 | Tifft |
| 6,905,816 B2 | 6/2005 | Jacobs et al. |
| 6,937,147 B2 | 8/2005 | Dilbeck et al. |
| 6,941,311 B2 | 9/2005 | Shah et al. |
| 6,954,736 B2 | 10/2005 | Menninger et al. |
| 6,963,826 B2 | 11/2005 | Hanaman et al. |
| 6,965,816 B2 | 11/2005 | Walker |
| 6,972,687 B1 | 12/2005 | Marshall et al. |
| 6,978,268 B2 | 12/2005 | Thomas et al. |
| 6,996,567 B2 | 2/2006 | Ghukasyan |
| 7,019,740 B2 | 3/2006 | Georgalas |
| 7,047,253 B1 | 5/2006 | Murthy et al. |
| 7,080,081 B2 | 7/2006 | Agarwal et al. |
| 7,089,250 B2 | 8/2006 | Doganata et al. |
| 7,111,010 B2 | 9/2006 | Chen |
| 7,152,070 B1 | 12/2006 | Musick et al. |
| 7,179,645 B2 | 2/2007 | Humphreys et al. |
| 7,181,428 B2 | 2/2007 | Lawrence |
| 7,213,009 B2 | 5/2007 | Pestotnik et al. |
| 7,230,930 B2 | 6/2007 | Ahya et al. |
| 7,240,330 B2 | 7/2007 | Fairweather |
| 7,295,925 B2 | 11/2007 | Breed et al. |
| 7,346,492 B2 | 3/2008 | Shaw |
| 7,403,922 B1 | 7/2008 | Lewis et al. |
| 7,433,853 B2 | 10/2008 | Brockway et al. |
| 7,533,113 B1 | 5/2009 | Haddad |
| 7,543,149 B2 | 6/2009 | Ricciardi et al. |
| 7,580,922 B2 | 8/2009 | Friedlander et al. |
| 7,630,330 B2 | 12/2009 | Gatts |
| 7,631,222 B2 | 12/2009 | Hasan et al. |
| 7,644,056 B2 | 1/2010 | Khalsa |
| 7,676,390 B2 | 3/2010 | Senturk et al. |
| 7,685,083 B2 | 3/2010 | Fairweather |
| 2001/0051881 A1 | 12/2001 | Filler |
| 2002/0004782 A1* | 1/2002 | Cincotta ............... 705/39 |
| 2002/0049772 A1 | 4/2002 | Rienhoff, Jr. et al. |
| 2002/0052756 A1 | 5/2002 | Lomangino |
| 2002/0099691 A1 | 7/2002 | Lore et al. |
| 2002/0107824 A1 | 8/2002 | Ahmed |
| 2002/0111922 A1 | 8/2002 | Young et al. |
| 2002/0156791 A1 | 10/2002 | Nesamoney et al. |
| 2002/0184401 A1* | 12/2002 | Kadel, Jr. et al. ............... 709/315 |
| 2003/0014400 A1* | 1/2003 | Siegel ............... 707/3 |
| 2003/0033263 A1 | 2/2003 | Cleary |
| 2003/0074222 A1 | 4/2003 | Rosow et al. |
| 2003/0088438 A1 | 5/2003 | Maughan et al. |
| 2003/0126148 A1 | 7/2003 | Gropper et al. |
| 2003/0140063 A1 | 7/2003 | Pizzorno et al. |
| 2003/0171876 A1 | 9/2003 | Markowitz et al. |
| 2003/0177038 A1 | 9/2003 | Rao |
| 2003/0182281 A1* | 9/2003 | Wittkowski ............... 707/5 |
| 2003/0191699 A1 | 10/2003 | Deveault et al. |
| 2004/0006532 A1 | 1/2004 | Lawrence et al. |
| 2004/0006694 A1 | 1/2004 | Heelan et al. |
| 2004/0054144 A1 | 3/2004 | Itai |
| 2004/0122787 A1 | 6/2004 | Avinash et al. |
| 2004/0193572 A1 | 9/2004 | Leary |
| 2004/0249678 A1 | 12/2004 | Henderson |
| 2004/0249679 A1 | 12/2004 | Henderson et al. |
| 2005/0004823 A1 | 1/2005 | Hnatio |
| 2005/0038608 A1 | 2/2005 | Chandra et al. |
| 2005/0049988 A1 | 3/2005 | Dahlquist et al. |
| 2005/0050068 A1 | 3/2005 | Vaschillo et al. |
| 2005/0075995 A1* | 4/2005 | Stewart et al. ............... 706/52 |
| 2005/0102210 A1 | 5/2005 | Song et al. |
| 2005/0144062 A1 | 6/2005 | Mittal et al. |
| 2005/0149466 A1 | 7/2005 | Hale et al. |
| 2005/0165594 A1 | 7/2005 | Chandra et al. |
| 2005/0246189 A1 | 11/2005 | Monitzer et al. |
| 2006/0036560 A1 | 2/2006 | Fogel |
| 2006/0069514 A1 | 3/2006 | Chow et al. |
| 2006/0155627 A1 | 7/2006 | Horowitz |
| 2006/0184483 A1 | 8/2006 | Clark et al. |
| 2006/0200435 A1 | 9/2006 | Flinn et al. |
| 2006/0218010 A1 | 9/2006 | Michon et al. |
| 2006/0282222 A1 | 12/2006 | Mitsuyama et al. |
| 2006/0287890 A1 | 12/2006 | Stead et al. |
| 2007/0027674 A1 | 2/2007 | Parson et al. |
| 2007/0073654 A1 | 3/2007 | Chow et al. |
| 2007/0073754 A1 | 3/2007 | Friedlander et al. |
| 2007/0106478 A1 | 5/2007 | Jung et al. |
| 2007/0174090 A1 | 7/2007 | Friedlander et al. |
| 2007/0174091 A1 | 7/2007 | Friedlander et al. |
| 2007/0185586 A1 | 8/2007 | Al-Attar et al. |
| 2007/0185737 A1 | 8/2007 | Friedlander et al. |
| 2007/0203872 A1* | 8/2007 | Flinn et al. ............... 706/62 |
| 2007/0233631 A1 | 10/2007 | Kobayashi et al. |
| 2007/0244701 A1 | 10/2007 | Erlanger et al. |
| 2007/0274337 A1* | 11/2007 | Purpura ............... 370/465 |
| 2007/0276851 A1 | 11/2007 | Friedlander et al. |
| 2007/0299691 A1 | 12/2007 | Friedlander et al. |
| 2008/0015871 A1* | 1/2008 | Eder ............... 705/1 |
| 2008/0065576 A1 | 3/2008 | Friedlander et al. |
| 2008/0077463 A1 | 3/2008 | Friedlander et al. |
| 2008/0082374 A1* | 4/2008 | Kennis et al. ............... 705/7 |
| 2008/0114779 A1 | 5/2008 | Friedlander et al. |
| 2008/0172352 A1 | 7/2008 | Friedlander et al. |
| 2008/0177687 A1 | 7/2008 | Friedlander et al. |
| 2008/0177688 A1 | 7/2008 | Friedlander et al. |
| 2008/0208801 A1 | 8/2008 | Friedlander et al. |
| 2008/0208813 A1 | 8/2008 | Friedlander et al. |
| 2008/0208814 A1 | 8/2008 | Friedlander et al. |
| 2008/0208832 A1 | 8/2008 | Friedlander et al. |

| | | | |
|---|---|---|---|
| 2008/0208838 | A1 | 8/2008 | Friedlander et al. |
| 2008/0208875 | A1 | 8/2008 | Friedlander et al. |
| 2008/0208901 | A1 | 8/2008 | Friedlander et al. |
| 2008/0208902 | A1 | 8/2008 | Friedlander et al. |
| 2008/0208903 | A1 | 8/2008 | Friedlander et al. |
| 2008/0208904 | A1 | 8/2008 | Friedlander et al. |
| 2008/0228747 | A1* | 9/2008 | Thrall et al. ............ 707/5 |
| 2009/0106179 | A1 | 4/2009 | Friedlander et al. |

FOREIGN PATENT DOCUMENTS

| | | |
|---|---|---|
| EP | 0959635 | 11/1999 |
| JP | 8316872 | 11/1999 |
| JP | 2002312373 | 4/2001 |
| JP | 2002342484 | 2/2002 |
| WO | 9419571 | 9/1994 |
| WO | 9726718 | 7/1997 |
| WO | 0108077 | 2/2001 |

OTHER PUBLICATIONS

Hayes et al., "Picking Up the Pieces: Utilizing Disaster Recovery Project Management to Improve Readiness and Response Time", IEEE Industry Applications Magazine, Nov./Dec. 2002, pp. 1-10.

Wang et al., "A Mathematical Approach to Disaster Recovery Planning", Xidian University, National Info Security Engineering and Technology Research Center, Beijing, China, Proceedings of the First International Conference of Semantics, Knowledge, and Grid, SKG 2005, pp. 1-3.

Silver, E.A., "An Overview of Heuristic Solution Methods", The Journal of the Operational Research Society, vol. 55, No. 9, Sep. 2004, pp. 936-956.

Chen et al., "Research on Organization Method of Development Activities for Complicated Product", The 9th International Conference on Computer Supported Cooperative Work in Design Proceedings, vol. 1, May 24-26, 2005, pp. 234-239.

Cao et al., "Research on Resource Scheduling for Development Process of Complicated Product", The 9th International Conference on Computer Supported Cooperative Work in Design Proceedings, vol. 1, May 24-26, 2005, pp. 229-331.

Altmann et al., "Cooperative Software Development: Concepts, Model and Tools", C Doppler Laboratory for Software Engineering, Johannes Kepler University, Linz, 1999, pp. 194-207.

Souder, William E., "Analytical Effectiveness of Mathematical Models for R&D Project Selection", Management Science, Application Series, vol. 19, No. 8, Apr. 1973, pp. 907-923.

U.S. Appl. No. 11/542,397, filed Oct. 3, 2006, Friedlander et al.
U.S. Appl. No. 11/516,954, filed Sep. 7, 2006, Friedlander et al.
U.S. Appl. No. 12/130,779, filed May 30, 2008, Friedlander et al.
U.S. Appl. No. 12/121,947, filed May 16, 2008, Angell et al.
U.S. Appl. No. 12/135,972, filed Jun. 9, 2008, Angell et al.
U.S. Appl. No. 12/135,960, filed Jun. 9, 2008, Angell et al.
U.S. Appl. No. 12/243,825, filed Oct. 1, 2008, Angell et al.

Luckham et al., "Event Processing Glossary", May 2008, Retrieved Jun. 9, 2008, pp. 1-13, <http://complexevents.com/?p=361>.

"AHRQ Quality Indicators—Patient Safety Indicators—Technical Specifications", Department of Health and Human Services Agency for Healthcare Research and Quality, Version 3.1, Mar. 12, 2007, pp. 1-107, <http://www.qualityindicators.ahrq.gov>.

Adam et al., "Positive Patient Identification: a Practical Solution to a Challenging Problem", Toward an Electronic Patient '97. Conference and Exposition. Proceedings, Pt. vol. 3, 1997, Abstract Only.

Ahmada et al., An artificial neural network model for generating hydrograph from hydro-meteorological parameters, Department of Civil, Architectural and Environmental Engineering, University of Miami, Mar. 31, 2005.

Beaglehole, R, Men Ageing and Health: Achieving health across the life span, 2nd World Congress on the Ageing Male, World Health Organization, Feb. 2000, pp. 1-63.

Chatfield, "Marketing an HMO by 'Smart' ID Cards with Patient History on an Electronic Medical Record", Proceedings. Toward an Electronic Patient Record '96. Twelfth International Symposium on the Creation of Electronic Health Record System and Global Conference on Patient Cards, Pt. vol. 1, 1996.

Gabrieli, "Guide for Unique Healthcare Identifier Model", Journal of Clinical Computing, vol. 21, No. 5, 1993, Abstract Only.

Goehring, "Identification of Patients in Medical Databases—Soundex Codes Versus Match Code", Medical Informatics, vol. 10, No. 1, pp. 27-34, Jan.-Mar. 1985, Abstract Only.

Goodwin et al., "Data Mining for Preterm Birth Prediction", pp. 46-51.

Grimson et al., "The SI Challenge in Health Care", Communications of the ACM, vol. 43, No. 6, Jun. 2000, pp. 49-55.

Grzymala-Busse, "Knowledge Acquisition Under Uncertainty—a Rough Set Approach", in: Journal of Intelligent and Robotic Systems (1988). Available at Springer.

Han and Fu, "Discovery of Multiple-Level Association Rules from Large Databases," in: Proceedings of the 21st VLDB Conference (1995). http://citeseerx.ist.psu.edu/viewdoc/download?doi=10.1.1.64.3214&rep1&type=pdf.

Hashemi et al., "Development of Group's Signature for Evaluation of Skin Cancer in Mice Cause by Ultraviolet Radiation", Proceedings of the International Conference of Information Technology: Computers and Communications, ITCC 2003, IEEE Computer Society, Washington, DC, USA, Apr. 28-30, 2003, pp. 1-4.

Hoshiai et al., "SION Architecture: Semantic Information-Oriented Network Architecture", Transactions of the Institute of Electronics, Information and Communication Engineers, vol. J84-B, No. 3, pp. 411-424, Mar. 2001, Abstract Only.

Hsinchun, Machine Learning for Information Retrieval: Neural Networks, Symbolic Learning, and Genetic Algorithms, Journal of the American Society for Information Science, Apr. 1995.

Johansson et al., "Visual Analysis Based on Algorithmic Classification", Proceedings of the Seventh International Conference on Information Visualization, London, England, Jul. 16-18, 2003, pp. 1-4.

Karlaftis et al., "Effects of road geometry and traffic volumes on rural roadway accident rates" Accident Analysis and Prevention 34, 357-365 2002.

Kiang, "Extending the Kohonen Self-Organizing Map Networks for Clustering Analysis", Journal, Computational Statistics & Data Analysis, vol. 38, Dec. 2, 2001, pp. 161-180.

"Lab4" web page archived on Jul. 11, 2004 at: http://web.archive.org/web/20040711205854/http://www-users.cs.umn.edy/~mckoskey/CSC15708_databases/original /lab4.html.

Laura et al., "IBM Federated Database Technology", Mar. 1, 2002. http://www.ibm.com/developerworks/data/library/techarticle/0203haas/0203haas.html.

Lowery et al., "Barriers to Implementing Simulation in Health Care", Proceedings from the 1994 Winter Simulation Conference, pp. 868-875.

Lurie, "The Federation Database Interoperability," Apr. 24, 2003. http://www.ibm.com/developerworks/data/library/techarticle/0304lurie/0304lurie.html.

McShan et al., "PathMiner: predicting metabolic pathways by heuristic search", School of Medicine, University of Colorado, 2003.

Polak et al., "Using Automated Analysis of the Resting Twelve-Lead ECG to Identify Patients at Risk of Developing Transient Myocardial Ischaemia—an Application of an Adaptive Logic Network", Physiological Measurement, vol. 18, No. 4, Nov. 1997, Abstract Only.

Plum et al., Novel Thret-Risk Index Using Probabilistic Threat Assesment and Human Reliability Analysis, 2004. http://www.inl.gov/technicapublications/documents/2535260.pdf.

Schadow et al., "Discussion Paper: Privacy-Preserving Distributed Queries for a Clinical Case Research Network," in: IEE Int'l Conference on Data Mining Workshop on Privacy, Security, and Data Mining (2002). Available at: ACM.

Shelfer et al., "Smart Card Evolution", Communications of the ACM, vol. 45, No. 7, Jul. 2002, pp. 83-88, Abstract Only.

Toffoli et al., "Freak Waves: Clues for Prediction in Ship Accidents?", The Internationa Society of Offshore and Polar Engineers 2003.

Wang, "A COBRA-based Object Framework with Patient Identification Translation and Dynamic Linking. Methods for Exchanging Patient Data", Methods of Information in Medicine, vol. 38, No. 1, Mar. 1999, Abstract Only.

Wong et al., "Rule-Based Anomaly Pattern Detection for Detecting Disease Outbreaks," in: AAAI-02 Proceedings (2002) https://www.Aaai.org/Papers/AAAI/2002/AAAI02-034.pdf.

* cited by examiner

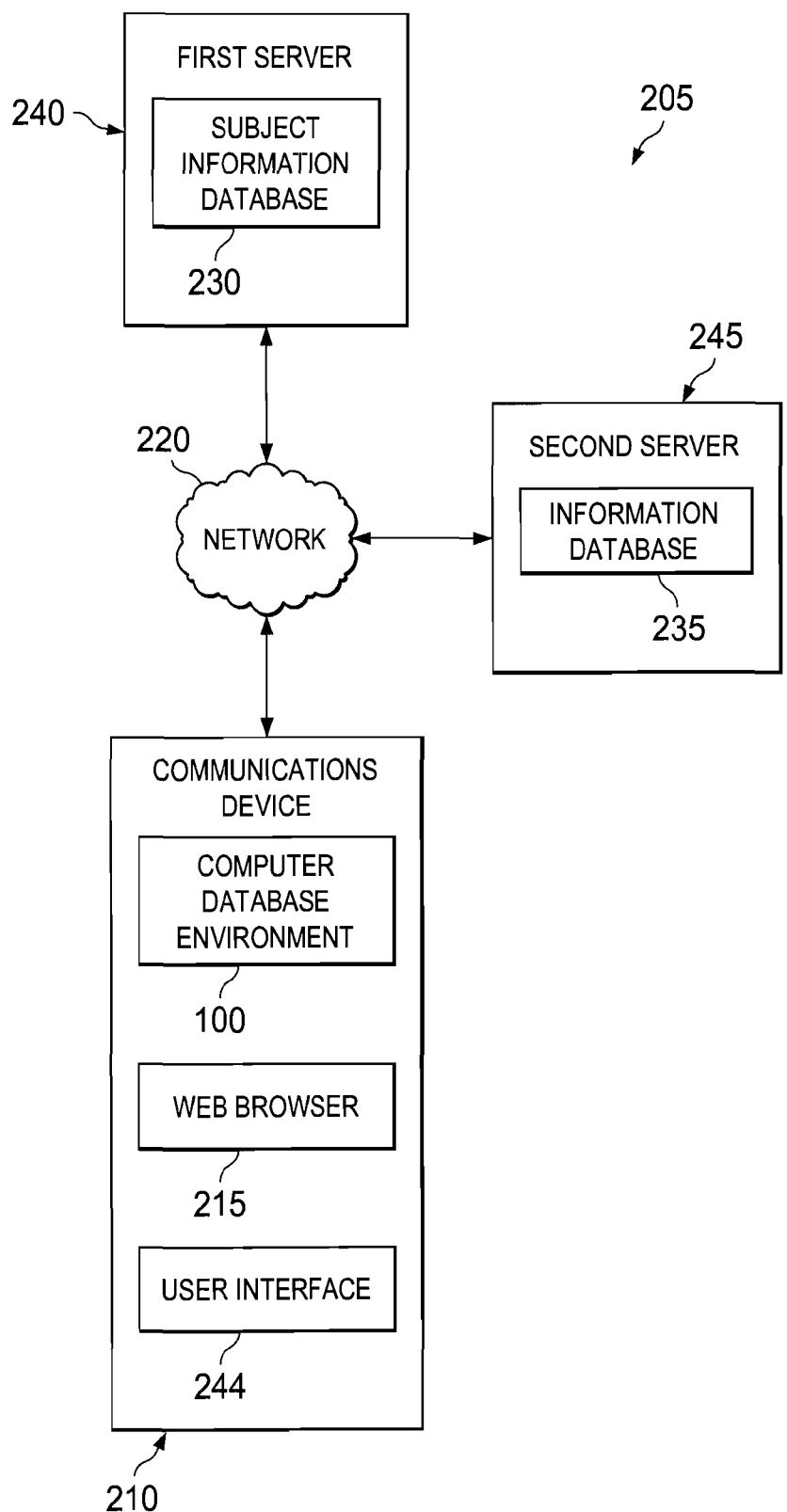

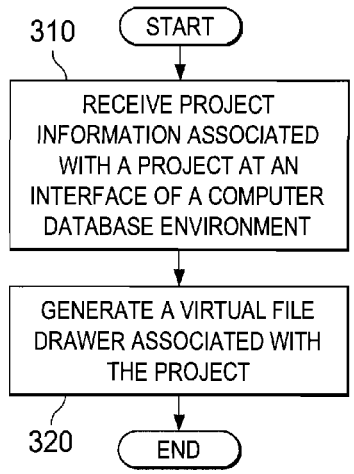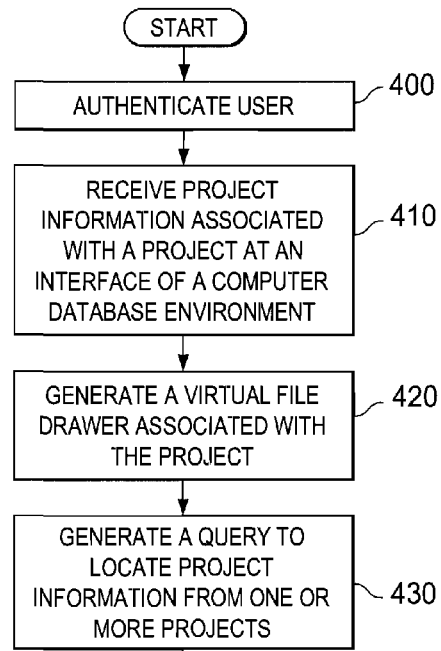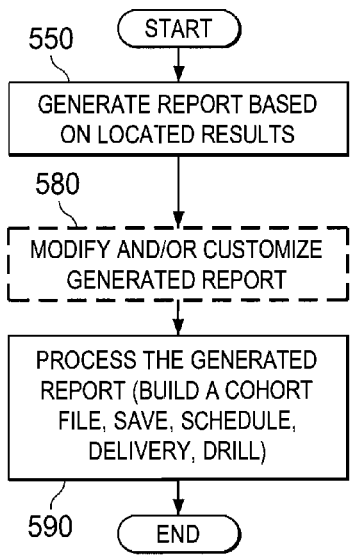

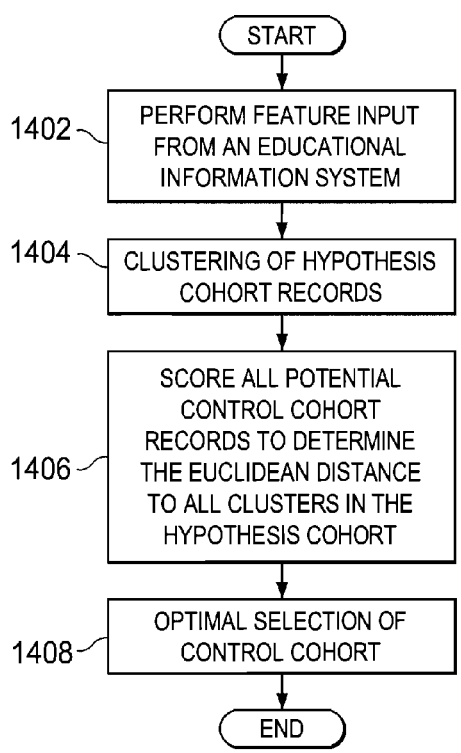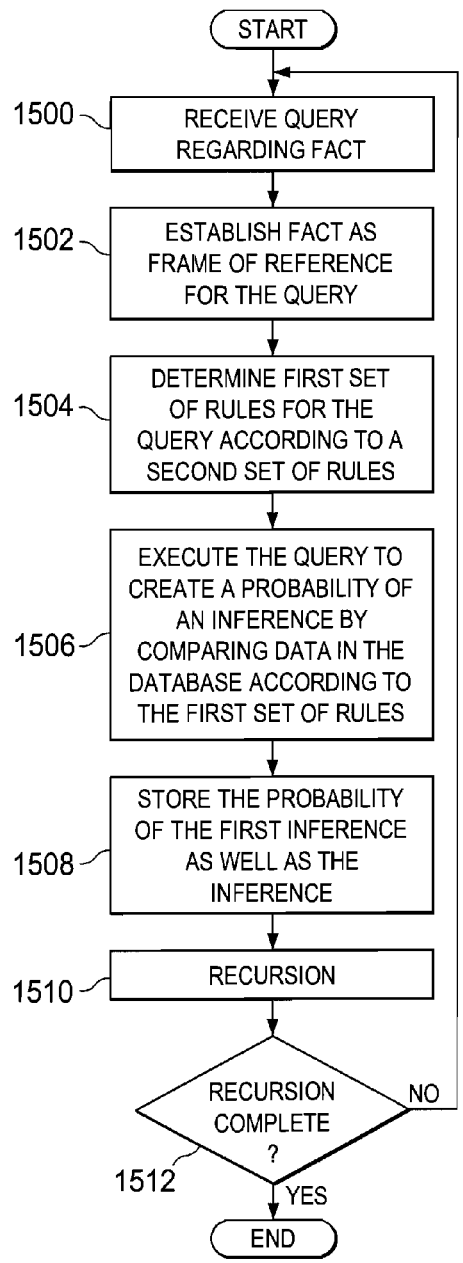

SYSTEM AND METHOD FOR THE LONGITUDINAL ANALYSIS OF EDUCATION OUTCOMES USING COHORT LIFE CYCLES, CLUSTER ANALYTICS-BASED COHORT ANALYSIS, AND PROBABILISTIC DATA SCHEMAS

BACKGROUND OF THE INVENTION

1. Field of the Invention

The present invention relates generally to an improved method, computer program product, and data processing system. More particularly, the present invention relates to analysis of educational outcomes using cohorts and probabilistic data schemas.

2. Description of the Related Art

Educational methods and outcomes are subject to intensive debate in the United States and other countries. In the United States, a great deal of both Federal and State legislation has been passed in an effort to improve education. However, a great deal of analysis is generated without achieving much learning because educational analysis is not fundamentally data-centric. While statistics and tests may be generated, very little knowledge concerning students, teachers, curricula, and outcomes is generated through extended time periods. For example, factors such as demographics, personality, and learning styles of teachers and students is not taken into account, and educational and life success of individual students is not taken into account. Instead, known solutions regarding educational outcomes tend to be episodic, simple statistical analytics that tend to be used in an outcome-driven manner. In some cases, a criticism of current data gathering techniques in the area of education is that the data gathering techniques and/or the subsequent analysis are designed to support specific outcomes in order to achieve some political objective.

Data processing in many industries, for example, the healthcare industry, may be done at a cohort level. A cohort is a set or group of things or people sharing similar characteristics. See our application Ser. No. 11/404,330, filed Apr. 13, 2006, for a further discussion of the application of cohorts to the healthcare industry.

Use of cohorts can be improved via control cohorts. A control cohort is a group selected from a population that is used as the control group. The control cohort is observed under ordinary conditions while another group is subjected to the hypothetical treatment or other factor being studied. The data from the control group is the baseline against which all other experimental results are measured. For example, a control cohort in a study of medicines for colon cancer may include individuals selected for specified characteristics, such as gender, age, physical condition, or disease state that do not receive the hypothetical treatment. The use and improvement of control cohorts is further described in our application Ser. No. 11/542,397, filed Oct. 3, 2006.

The control cohort is used for statistical and analytical purposes. Particularly, the control cohorts are compared with action or hypothesis cohorts to note differences, developments, reactions, and other specified conditions. Control cohorts are heavily scrutinized by researchers, reviewers, and others that may want to validate or invalidate the viability of a test, hypothetical treatment, or other research. If a control cohort is not selected according to scientifically accepted principles, an entire research project or study may be considered of no validity wasting large amounts of time and money. In the case of education research, selection of a less than optimal control cohort may prevent proving the efficacy of a drug or hypothetical treatment or incorrectly rejecting the efficacy of a drug or hypothetical treatment. In the first case, billions of dollars of potential revenue may be lost. In the second case, a drug or hypothetical treatment may be necessarily withdrawn from marketing when it is discovered that the drug or hypothetical treatment is ineffective or harmful leading to losses in drug development, marketing, and even possible law suits.

As stated above, to date, studies of educational outcomes have been flawed. Additionally, to date, cohorts and control cohorts have not been applied to in-depth, data-centric analysis of educational outcomes.

SUMMARY OF THE INVENTION

The illustrative embodiments include a computer implemented method, computer program product, and data processing system for performing analysis on a plurality of data stored in a database. In an illustrative method, a first cohort is generated from the plurality of data. An optimal control cohort is generated from the plurality of data. Generating is performed based on the first cohort and at least one constraint, and a mathematical process is used to derive the optimal control cohort. A first inference is generated based on a comparison of the first cohort to the optimal control cohort, wherein the first inference is absent from the database. In an illustrative example, the first inference is stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary network environment, in accordance with an illustrative embodiment;

FIG. 3 is a flowchart illustrating operations of cohorts, in accordance with an illustrative embodiment;

FIG. 4 is a flowchart illustrating operations of cohorts, in accordance with an illustrative embodiment;

FIG. 5 is a flowchart illustrating operations of cohorts, in accordance with an illustrative embodiment;

FIG. 14 is a process for optimal selection of control cohorts in accordance with an illustrative embodiment;

FIG. 15 is a flowchart illustrating execution of a query in a database to establish a probability of an inference based on data contained in the database, in accordance with an illustrative embodiment.

DETAILED DESCRIPTION OF THE PREFERRED EMBODIMENT

Figure 1:
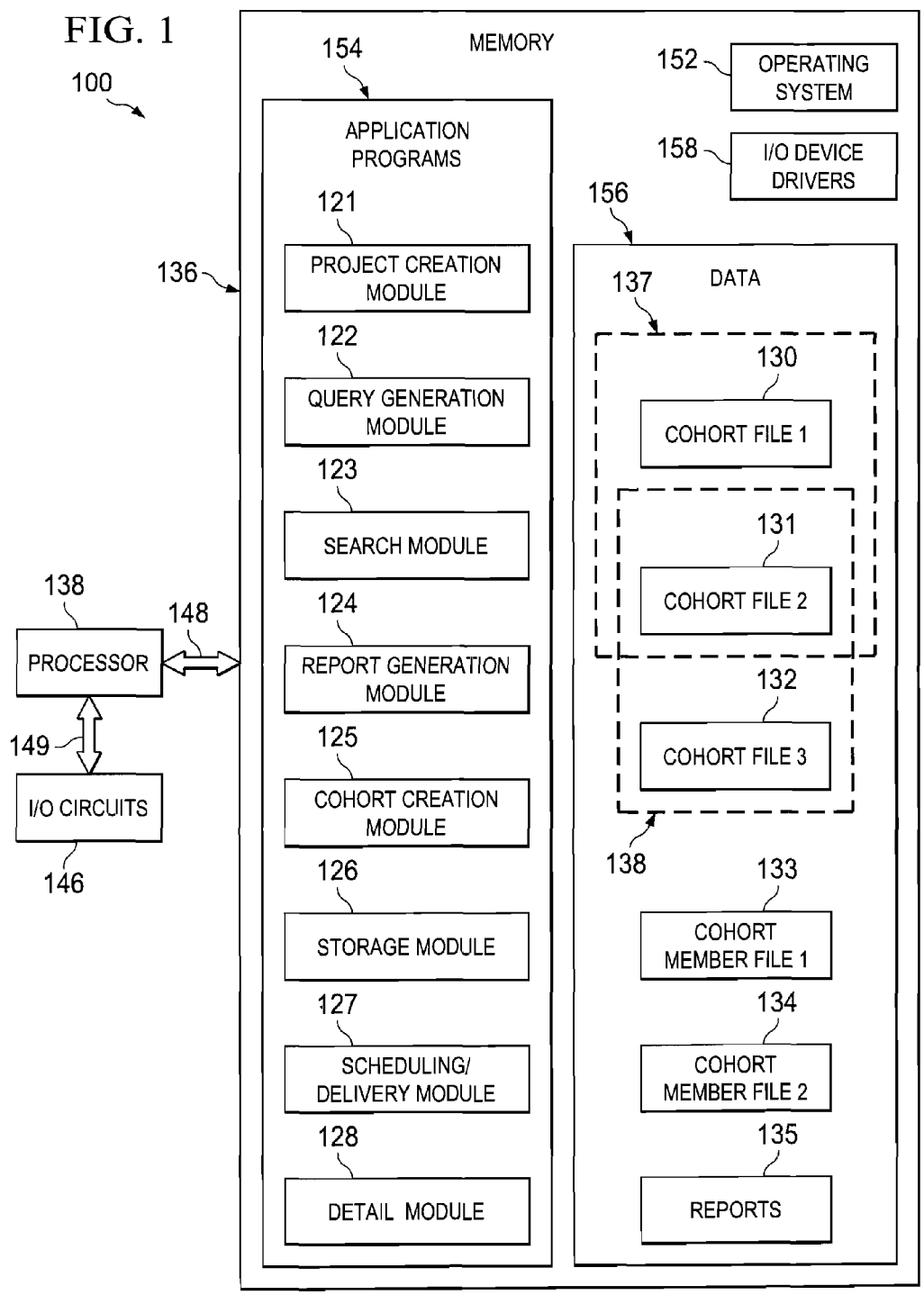
FIG. 1 is a block diagram illustrating a data processing system, in accordance with an illustrative embodiment.

Combined, the cohorts, control cohorts, and probabilistic generation of inferences described herein allow for a powerful method of performing educational outcome analysis. Combined, the illustrative embodiments support the longitudinal analysis of various testing methods and learning styles. Such longitudinal analyses support the processing of information known to a high degree of validity based on derived probabilities.

Potential outcomes include the analysis of long term outcomes measured across multiple diverse metrics of inputs, such as students, teachers, curricula, resources, legislation, parental involvement, family income of student families, school geographical location, learning styles, teaching styles, race, gender, ethnicity, religious orientation, and possibly many other factors. Additionally, millions of students and teachers can be included in any given study over multiple decades, thereby vastly increasing the applicability and validity of any given hypothesis testing.

This approach creates a much deeper, qualitatively superior analysis of educational outcomes and hypothesis testing relative to older, simple, outcome-driven statistical methods. Thus, the illustrative embodiments would allow for the creation of superior education policies based on a vast storehouse of empirical data, rather on limited statistical studies. Superior education policies are those education policies that result in more effective student learning and in higher rates of life success in students after students graduate from school.

In considering how to accomplish this goal, the concept and use of cohorts is explored first. Research in many fields may be conducted using cohort data. As used herein, the term "cohort" refers to a set or group of things or people sharing similar characteristics. Characteristics may include, for example, physical characteristics, presence or absence of a condition or conditions, age, geographic location and the like. The cohort may be defined by the person conducting the research study, and a research study may include one or more cohorts. For example, a researcher may be researching the effect of a particular education style on male sixth-grade students' success in high school. Thus, the cohort may be defined by characteristics including male, grade, age, learning style, high school graduation rates, test scores, and possibly many other factors.

Although research studies are discussed herein with respect to the educational studies, embodiments of the illustrative embodiments are not limited to this field. For example, other illustrative embodiments may be used for studies in any field that lend themselves to the use of cohorts without departing from the scope of the illustrative embodiments.

Currently, there is no easy and convenient way of maintaining complete records of the global differences between educational outcomes and control cohorts of research studies involving multiple cohorts. Typically, at the end of a research study (project), the owner (administrator) of the study will publish the study (or report associated therewith). The information published can be very detailed and without a method or system for maintaining the information. Consolidating the information and present it in a useful way can be difficult. Furthermore, because there is no easy way to maintain information associated with the study, not everything may be recorded. For example, each time a potential subject for the study is considered and denied, the information associated with this candidate and why he or she was rejected may not be recorded. Thus, the study owner may be accused of "cherry picking" the members of the study and have nothing documented to prove otherwise.

Many times when a research study is performed, two cohorts may be used in the study. The two cohorts may be an initial cohort and a cohort that is statistically balanced to the initial cohort. In other words, the initial study may include a 100 member cohort and a statistically balanced cohort having 100 members, each of which has demographic information, curriculum information, and learning style information as close as possible to a corresponding member of the initial cohort. Without any method or system of recording the data with respect to the initial cohort and its 100 members, choosing the members of the statistically balanced cohort may be relatively difficult.

The illustrative embodiments described herein provide for storing, organizing and/or manipulating cohort based information associated with a research study are provided. For example, a study owner (administrator) may create a virtual file drawer that includes information on one or more cohorts for the study and the members of these cohorts. Furthermore, the owner may store any information associated with the study in the virtual file drawer associated with the study. The information in the virtual file drawer may be saved in such a way that it can be searched, manipulated and the like.

The illustrative embodiments allow inclusion of research queries in cohorts, such as queries that were used to generate the cohort. The illustrative embodiments may be configured to recall details of the previously run queries, such as which members were excluded due to a given reason. This capability is useful in a research study extending over multiple years. Details of some illustrative embodiments will be further discussed below with respect to FIGS. 1 through 5.

FIG. 1 is a block diagram illustrating a data processing system, in accordance with an illustrative embodiment. FIG. 1 illustrates an exemplary data processing system 100 or computer database environment that may be included in devices operating in accordance with some illustrative embodiments. As illustrated, the data processing system 100 includes a processor 138, a memory 136 and input/output circuits 146. The data processing system 100 may be incorporated in, for example, a personal computer, server, router or the like. The processor 138 communicates with the memory 136 via an address/data bus 148 and communicates with the input/output circuits 146 via an address/data bus 149. The input/output circuits 146 can be used to transfer information between the memory 136 and another computer system or a network using, for example, an Internet protocol (IP) connection. These components may be conventional components such as those used in many conventional data processing systems, which may be configured to operate as described herein.

In particular, the processor 138 can be any commercially available or custom microprocessor, microcontroller, digital signal processor or the like. The memory 136 may include any memory devices containing the software and data used to implement the functionality circuits or modules used in accordance with the illustrative embodiments. The memory 136 can include, but is not limited to, the following types of devices: cache, ROM, PROM, EPROM, EEPROM, flash memory, SRAM, DRAM and magnetic disk. In some illustrative embodiments, the memory 136 may be a content addressable memory (CAM).

As further illustrated in FIG. 1, the memory 136 may include several categories of software and data used in the data processing system 100: an operating system 152; application programs 154; input/output device drivers 158; and data 156. As will be appreciated by those of skill in the art, the operating system 152 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some illustrative embodiments. Finally, the data 156 represents the static and dynamic data used by the application programs 154, the operating system 152, the input/output device drivers 158, and other software programs that may reside in the memory 136. As illustrated in FIG. 1, the data 156 may include cohort files 130, 131 and 132, cohort member files 133 and 134 and reports 135 for use by the circuits and modules of the application programs 154 according to some illustrative embodiments, as discussed further herein.

Although three cohort files 130, 131 and 132, two cohort member files 133 and 134 and a single reports file 135 are illustrated in FIG. 1, the illustrative embodiments are not limited to this configuration. For example, more or less than three cohort files, more or less than two cohort member files and more than one reports file may be present without departing from the scope of the illustrative embodiments. Furthermore, as further illustrated in FIG. 1, the cohort files 130, 131 and 132 may be present in one or more virtual file drawers. In other words, the same cohort files may be used in two different studies associated with two different file drawers. In particular, cohort file 1 is present in a first virtual file drawer 137 and cohort file 3 is present in a second virtual file drawer 138. Furthermore, cohort file 2 131 is present in the first and second virtual file drawers 137 and 138. Similarly, cohort member files may be present in one or more file drawers without departing from the scope of the illustrative embodiments.

As further illustrated in FIG. 1, according to some illustrative embodiments, the application programs 154 include a project creation module 121, a query generation module 122, a search module 123, a report generation module 124, a cohort creation module 125, a storage module 126, a scheduling/delivery module 127 and a detail module 128. While the illustrative embodiments are illustrated with reference to the project creation module 121, the query generation module 122, the search module 123, the report generation module 124, the cohort creation module 125, the storage module 126, the scheduling/delivery module 127 and the detail module 128 being application programs in FIG. 1, as will be appreciated by those of skill in the art, other configurations fall within the scope of the illustrative embodiments. For example, rather than being application programs 154, these circuits and modules may also be incorporated into the operating system 152 or other such logical division of the data processing system 100.

Furthermore, while the project creation module 121, the query generation module 122, the search module 123, the report generation module 124, the cohort creation module 125, the storage module 126, the scheduling/delivery module 127 and the detail module 128 are illustrated in a single data processing system, as will be appreciated by those of skill in the art, such functionality may be distributed across one or more data processing systems. Thus, the illustrative embodiments should not be construed as limited to the configuration illustrated in FIG. 1, but may be provided by other arrangements and/or divisions of functions between data processing systems. For example, although FIG. 1 is illustrated as having various circuits and modules, one or more of these circuits or modules may be combined without departing from the scope of the illustrative embodiments.

FIG. 2 is an exemplary network environment, in accordance with an illustrative embodiment. FIG. 2 illustrates an exemplary environment 205 for operations and devices according to some illustrative embodiments. As illustrated in FIG. 2, the environment 205 may include a communications device 210, a network 220, a first server 240 and a second server 245. It will be understood that the communications device 210 illustrated in FIG. 2 may include the data processing system 100 or database environment discussed above with respect to FIG. 1. The communications device 210 may be, for example, a laptop computer, a desktop computer, a personal data assistant (PDA), a web capable mobile terminal or any device capable of communicating with the network 220. The communications device 210 may include a user interface 244 and a web browser 215 that may be accessed through the user interface 244. The first and second servers 240 and 245 may include first and second database environments 230 and 235, respectively, which may include subject records and information for use in some illustrative embodiments. The communications device 210 may communicate over the network 220, for example, the internet, through a telephone line, a digital subscriber link (DSL), a broadband cable link, a wireless link or the like. The first and second servers 240 and 245 may also communicate over the network 220. Thus, the network 220 may convey data between the communications device 210 and the first and second servers 240 and 245.

When an owner (or administrator) of a research study begins a new study he or she may create a new virtual file drawer for the research study. The user interface 244 for the computer database environment 100 may be used to enter/provide project information associated with the research study or project.

Before this information can be entered, in some illustrative embodiments, a user may have to provide authorization information. In some illustrative embodiments, the user may enter both user identification and a role code as discussed in, for example, copending U.S. patent application Ser. No. 11/349,408, filed Feb. 7, 2006.

Once authorized, the user may enter cohort information, for example, demographic, genetic, educational, and/or life style characteristics for the members of the cohort. As discussed above, as used herein, a "cohort" refers to a group or set of things or people sharing or potentially sharing one or more characteristics. For example, "characteristics" according to some illustrative embodiments may include physical characteristics, presence or absence of a condition or conditions, age, geographic location and the like. The cohort may be defined by the person conducting the research study and a research study may include one or more cohorts. For example, a researcher may be researching the effect of a learning style on life ultimate success of students, as evaluated according to predetermined criteria. Thus, the cohort may be defined by characteristics including learning styles, student age, and the predetermined criteria.

In some illustrative embodiments, the entered cohort information may be associated with an existing cohort. For example, existing cohorts may be split, merged and/or copied to provide the entered cohort information. Cohorts may be inherited from external systems and used as, for example reference cohorts.

The user may also enter subject information regarding a subject of the study (such as an individual student) through the user interface 244. The subject information may include, for example, name, address, phone number, age, learning style, details thereof, and the like. The subject information may also include testing data associated with the subject. This information may be stored directly in the computer database environment. Alternatively, a link may be stored in the computer database environment 100 which allows access to information stored on external databases, such as the subject information database 230 on the first server 240 and the information database 235 on the second server 240. Similar to cohorts, the entered subject information may be associated with an existing subject. For example, existing subject information may be split, merged, copied and/or inherited from external systems.

A project or research study may have from zero to N cohorts. A cohort may have from zero to M members (subjects, subjects, and the like). A single cohort may belong to one or more research studies. Cohorts have roles or purposes, for example, a control cohort in research studies (projects) that may change over time. Cohort members also have roles or purposes, for example, control, rejected, drug, hypothetical treatment, dropped and the like, in cohorts that may change over time.

Once the cohort/subject information is entered through the user interface 244, the project creation module 121 may be configured to generate a virtual project drawer associated with the research study or project to be stored in the computer database environment 100. The cohort information and/or subject information entered by the user may be placed in cohort files and the cohort files may include cohort member files including the subject information entered by the user. These files may all be stored in the virtual file drawer created for the project or research study. Once these files are created and stored they may be modified, searched, reorganized, deactivated and the like without departing from the scope of the illustrative embodiments. Any manipulation of the data stored in the virtual file drawer, for example, addition, deletion, relocation, reorganization and the like, may be tracked, recorded and can be recreated at any point in the study according to some illustrative embodiments.

The project creation module 121 may be configured to use a series of education record numbers (MRNs), of subjects entered by the user. A business intelligence tool may be used to create a query to return subjects for a cohort. The project creation module 121 may be configured to prompt a user to upload a properly formatted document with subject MRNs or agreed upon unique identifier. In certain embodiments, the project creation module 121 may be configured to use an algorithm to create a statistically equivalent cohort based on selected criteria. Furthermore, the project creation module 121 may be configured merge existing cohorts or split existing cohorts to create a new cohort.

Thus, preparing a report of the research study may be relatively less difficult, because all of the information is stored and accessible electronically. For example, even information associated with rejected cohort members may be stored in the virtual file drawer with a role—rejected and the reasons therefore. Thus, the possibility of being accused of "cherry picking" cohort members may be reduced. Furthermore, building a statistically balanced cohort as discussed above may be relatively less difficult according to some illustrative embodiments, which will be discussed further below.

In particular, a statistically balanced cohort can be generated using equations according to some illustrative embodiments. To minimize the sum of the weights for the set of the study/control pairing, the following equation is used:

$$\text{Minimize} \sum_{i=1}^{n} \sum_{j=1}^{m} Weight_{i,j} * SOS_{i,j} \quad \text{Equation (1)}$$

Objective Function
Where n is the subject number in the hypothesis cohort and m is the subject number in the (statistically balanced) control cohort $$\text{Subject to:} \sum_{i=1}^{n} SOS_{i,j} = 1 \text{ For } j = 1, m \quad \text{Equation (2)}$$

In some illustrative embodiments, each subject in the hypothesis cohort must be matched to exactly one subject in the control group (statistically balanced cohort), $$\sum_{j=1}^{m} SOS_{i,j} \le 1 = 1 \text{ For } i = 1, n \quad \text{Equations (3)}$$

Subjects in the control group can be used zero or one times.

$$SOS_{i,j} \in 0,1 \quad \text{Equation (4)}$$

The values of the selections vector can only take on the integer values of one or zero. Using these equations to locate members of the statistically balanced cohort allow these cohorts to be created relatively easier relative to creation without a computer database environment.

Although virtual file drawers discussed herein include cohort files and cohort member files, the illustrative embodiments are not limited by these examples. The virtual file folders may include any information associated with the project or research study. For example, a research grant application that preceded the beginning of the study may also be stored in the virtual file drawer without departing from the scope of the illustrative embodiments. Furthermore, the project information may further include owner information, authorized user information, a title of the project and/or start and/or end dates associated with the project.

Although the creation of a single virtual file drawer is discussed herein, the illustrative embodiments are not limited to this configuration. For example, two or more virtual file drawers 137 and 138 may be present in the computer database environment 100 without departing from the scope of the illustrative embodiments. Furthermore, cohort files and/or cohort member files may be included in one or more virtual file drawers without departing from the scope of the illustrative embodiments.

Once the cohort files and member files are created, a query generation module 122 may be configured to generate a query so as to locate project information, cohort information and/or subject information associated with the one or more of the projects (research studies) having associated virtual file drawers 137 and 138 in the computer database environment 100. The query generation module 122 allows the user to generate a query by selecting data elements (columns) for report. For example, the user may select age, gender, stage total/positive nodes, and the like. Also included may be pre-defined aggregation and data functions, such as average age. The query generation module 122 may also be configured to allow the user to select pre-existing query filter elements (criteria). For example, the user may select a study data range, subject learning style, subject grade, subject demographics, school system, teacher, and the like.

The query generation module 122 may also be configured to allow a user to create any custom query filter elements. For example, a user may drag and drop elements needed for custom filter onto the query. Each of these data elements may be individually and collectively filtered. For example, "(teacher in (A, B, C) or (age>65)) and (Gender=M)." The query generation module 122 may also be configured to allow the user to enter any Free Text/Semantic OmniFind criteria. For example, the user enters a Free Text or a Semantic Search.

In particular, the free text and semantic search tool OmniFind can be called to return results based on a users entered criteria when necessary. The free text and semantic criteria may be provided to OmniFind, which will execute the query. The results of the query may be provided to the computer database environment where they may be manipulated into a single report filter. The computer database environment may then insert that report filter into the user's report. At this point, control of the querying process may be returned to the query generation module 122 where the remaining elements of the querying may be handled. In some illustrative embodiments, the query generation module 122 may be configured to build and manipulate the query, the data and input process in a business intelligence tool.

Once the query is generated, the search module 123 may be configured to search the virtual project drawers 137 and 138 according to the generated query so as to locate results therein that may be relevant to the research study. In some illustrative embodiments, the search module 123 may be configured to use OmniFind. The report generation module 124 may be configured to generate a report including the located results.

In particular, once the search is complete, the report generation module 124 may be configured to generate the report responsive to a user selecting a "report" button on the user interface 244. In some illustrative embodiments, the user may apply style/formatting template to the query result and may add any desired custom aggregations by inserting cells and defining aggregation, for example, average (LOS). The user may select sort criteria for the report by, for example, clicking on one or more columns of the report.

In other words, the query generation module 122 is further configured to modify the generated query. The search module 123 may be further configured to search the project drawers according to the modified query so as to locate modified results therein that may be relevant to the research study. The report generation module 124 may be further configured to generate a modified report including the modified results. As discussed above, the report generation module 124 is further configured to modify and/or customize the generated report based on user input.

Finalized reports may be stored, for example, in the reports 135 section of the memory 136. To access these reports, the user may be presented with a list of existing reports. A user may, for example, click on a desired report on a graphical user interface provided on the communications device 210. The graphical user interface according to some illustrative embodiments may be customized to look like a researcher's notebook, windows file system, and the like. In other words, the user can customize the interface so that it is familiar to them.

The report may be executed, modified or customized. The authorization level of the user accessing the report may define how a user is allowed to use the report. Depending on the roles/permissions, the user can execute, modify existing or customize existing reports. Customizing may allow for new reports to be built on existing ones without affecting the original.

According to some illustrative embodiments, a finalized report stored in the memory 136 can be, for example, used to build a cohort, saved, scheduled, delivered and/or further refined. In particular, the cohort creation module 125 may be configured to build a cohort file based on the generated report. The cohort creation module 125 may be configured to communicate with the BI Tool to create a cohort from the generated report. The process may be instantiated when a user decides to create a cohort based of the results of an ad-hoc or structured report from the BI Tool. The cohort creation module 125 may be configured to save the BI Tool object and link to it from a cohort database record. The cohort, when modified at a later point, may use the BI Tool for modification.

In some illustrative embodiments, a user can run a query to view joiners i.e. subjects that currently meet the query criteria used to define the cohort, but did not meet these criteria when the query was run last. This query is accomplished by regenerating the report, wherein only display those subjects who joined since the previous run.

The storage module 126 may be configured to store the generated report. When the report is saved, access levels may be set that define who can access the report. The scheduling/delivery module 127 may be configured to schedule the generated report for a run. The run may be executed (the report may be executed) at the present moment or be delayed for later time. Furthermore, the detail module 128 may be configured to determine a delivery method for the generated report.

The detail module 128 may be configured to drill down into (further refine) the generated report to reveal underlying detail. For example, if a column of the report indicates subject count, a user can, for example, click on the number of subjects to reveal more detailed information about each of the subjects, such as name, gender, age and test results.

FIG. 3 is a flowchart illustrating operations of cohorts, in accordance with an illustrative embodiment. In FIG. 3, operations begin at block 310 by receiving project information associated with a first project at an interface of a computer database environment. The project information associated with the first project includes cohort information associated with one or more cohorts of the first project and subject information associated with members of the one or more cohorts of the first project. A first virtual project drawer associated with the first project may be generated to be stored in the computer database environment (block 320). The first virtual project drawer includes project information associated with the first project, one or more cohort files and/or two or more cohort member files.

In some illustrative embodiments, cohorts can belong to more than one project. Cohorts can be generated by, for example, splitting, copying and/or merging existing cohort files and/or member files. Project information, according to some illustrative embodiments, may include cohort data, subject information, owner information, authorized user information, a title of the project and/or start and/or end dates associated with the project. Cohort members of the project share one or more characteristics that define the cohort associated with the project and each of the cohort members of the project have at least one role associated therewith. The role may include, for example, teacher, student, administrator and/or whether any of the subjects have been dropped from the study.

FIG. 4 is a flowchart illustrating operations of cohorts, in accordance with an illustrative embodiment. Operations begin at block 400 by authenticating a user before allowing the user access to the computer database environment. Project information associated with a project is received at an interface of a computer database environment (block 410). The project information associated with the project includes cohort information associated with one or more cohorts of the project and subject information associated with members of the one or more cohorts of the project. A virtual project drawer associated with the project may be generated to be stored in the computer database environment (block 420). The virtual project drawer includes project information associated with the project, one or more cohort files and/or two or more cohort member files.

A query may be generated so as to locate project information, cohort information and/or subject information associated with the first and/or second projects (block 430). One or more project drawers may be searched according to the generated query so as to locate results therein that may be relevant to the research study (block 440). A report may be generated including the located results (block 450). A determination can be made whether the user is satisfied with the located results in the report (block 460). If the user is not satisfied (block 460), the user may modify/customize the query (block 470) and blocks 440 through 470 may be repeated until the user is satisfied with the results (block 460). If, on the other hand, the user is satisfied with the results (block 460), operations with respect to query modification may be complete.

FIG. 5 is a flowchart illustrating operations of cohorts, in accordance with an illustrative embodiment. Blocks represented by dotted lines are optional. A report based on the located results may be generated (block 550). In some illustrative embodiments, the generated report may be modified or customized (block 580). The generated report (or modified/customized report) may be processed (block 590). For example, the a cohort file may be built based on the generated report, the generated report may be saved, the generated report may be scheduled for a run, a delivery method for the generated report may be determined and/or the generated report may be drilled into (further refined) to reveal underlying detail associated with the located results as discussed above.

Figure 6:
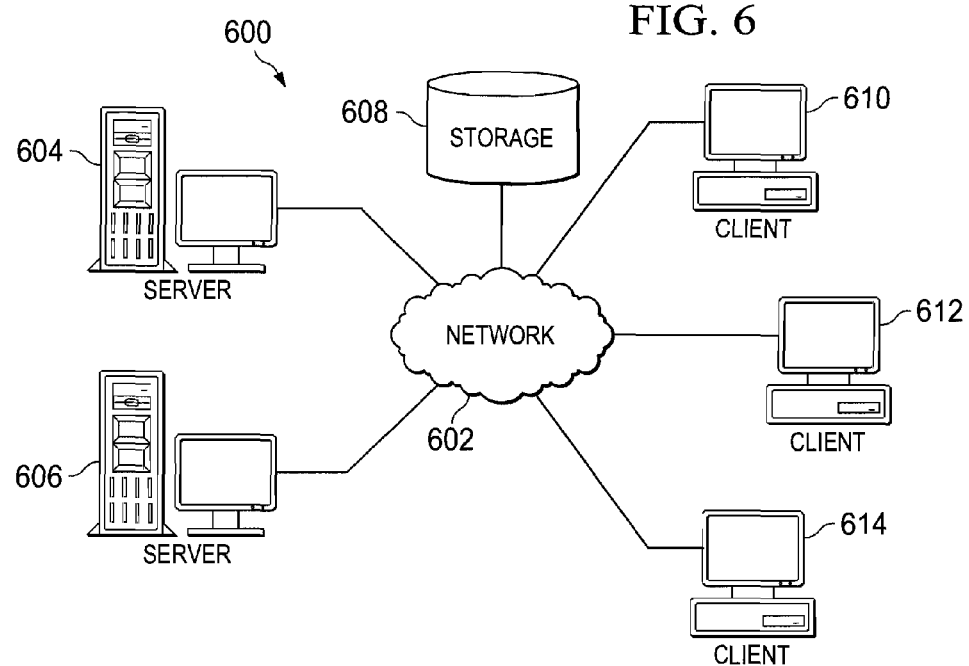
FIG. 6 is a pictorial representation of a data processing system in which an illustrative embodiment may be implemented.
Figure 7:
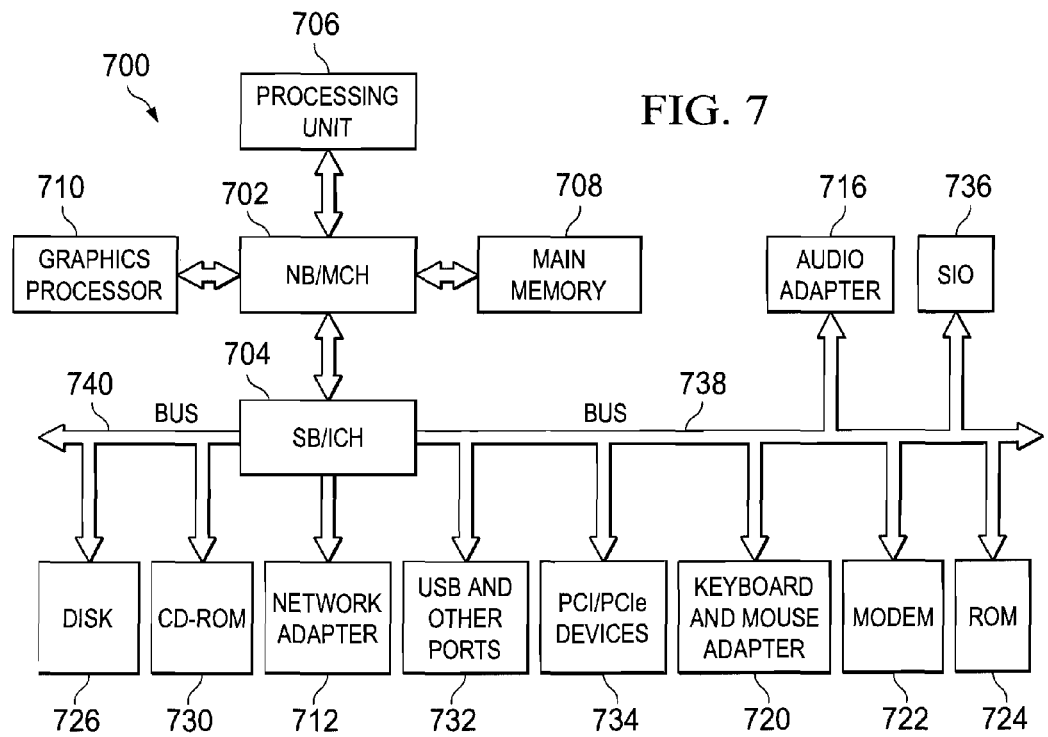
FIG. 7 is a block diagram of a data processing system in which an illustrative embodiment may be implemented.

FIGS. 6-7 are exemplary diagrams of data processing environments are provided in which illustrative embodiments may be implemented. FIGS. 6-7 are only exemplary and are not intended to assert or imply any limitation with regard to the environments in which different embodiments may be implemented. Many modifications to the depicted environments may be made.

With reference now to the figures, FIG. 6 is a pictorial representation of a network of data processing systems in which an illustrative embodiment may be implemented. Network data processing system 600 is a network of computers in which embodiments may be implemented. Network data processing system 600 contains network 602, which is the medium used to provide communications links between various devices and computers connected together within network data processing system 600. Network 602 may include connections, such as wire, wireless communication links, or fiber optic cables.

In the depicted example, server 604 and server 606 connect to network 602 along with storage unit 608. In addition, clients 610, 612, and 614 connect to network 602. These clients 610, 612, and 614 may be, for example, personal computers or network computers. In the depicted example, server 604 provides data, such as boot files, operating system images, and applications to clients 610, 612, and 614. Clients 610, 612, and 614 are clients to server 604 in this example. Network data processing system 600 may include additional servers, clients, and other devices not shown.

In the depicted example, network data processing system 600 is the Internet with network 602 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 600 also may be implemented as a number of different types of networks, such as for example, an intranet, a local area network (LAN), or a wide area network (WAN). FIG. 1 is intended as an example, and not as an architectural limitation for different embodiments.

With reference now to FIG. 7, a block diagram of a data processing system is shown in which an illustrative embodiment may be implemented. Data processing system 700 is an example of a computer, such as server 604 or client 610 in FIG. 6, in which computer usable code or instructions implementing the processes may be located for the different embodiments.

In the depicted example, data processing system 700 employs a hub architecture including a north bridge and memory controller hub (MCH) 702 and a south bridge and input/output (I/O) controller hub (ICH) 704. Processing unit 706, main memory 708, and graphics processor 710 are coupled to north bridge and memory controller hub 702. Graphics processor 710 may be coupled to the MCH through an accelerated graphics port (AGP), for example.

In the depicted example, local area network (LAN) adapter 712 is coupled to south bridge and I/O controller hub 704 and audio adapter 716, keyboard and mouse adapter 720, modem 722, read only memory (ROM) 724, universal serial bus (USB) ports and other communications ports 732, and PCI/PCIe devices 734 are coupled to south bridge and I/O controller hub 704 through bus 738, and hard disk drive (HDD) 726 and CD-ROM drive 730 are coupled to south bridge and I/O controller hub 704 through bus 740. PCI/PCIe devices may include, for example, Ethernet adapters, add-in cards, and PC cards for notebook computers. PCI uses a card bus controller, while PCIe does not. ROM 724 may be, for example, a flash binary input/output system (BIOS). Hard disk drive 726 and CD-ROM drive 730 may use, for example, an integrated drive electronics (IDE) or serial advanced technology attachment (SATA) interface. A super I/O (SIO) device 736 may be coupled to south bridge and I/O controller hub 704.

An operating system runs on processor 706 and coordinates and provides control of various components within data processing system 700 in FIG. 7. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 700 (Java and all Java-based trademarks are trademarks of Sun Microsystems, Inc. in the United States, other countries, or both).

Instructions for the operating system, the object-oriented programming system, and applications or programs are located on storage devices, such as hard disk drive 726, and may be loaded into main memory 708 for execution by processor 706. The processes of the illustrative embodiments may be performed by processor 706 using computer implemented instructions, which may be located in a memory such as, for example, main memory 708, read only memory 724, or in one or more peripheral devices.

The hardware in FIGS. 6-7 may vary depending on the implementation. Other internal hardware or peripheral devices, such as flash memory, equivalent non-volatile memory, or optical disk drives and the like, may be used in addition to or in place of the hardware depicted in FIGS. 6-7. Also, the processes of the illustrative embodiments may be applied to a multiprocessor data processing system.

In some illustrative examples, data processing system 700 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 708 or a cache such as found in north bridge and memory controller hub 702. A processing unit may include one or more processors or CPUs. The depicted examples in FIGS. 6-7 and above-described examples are not meant to imply architectural limitations. For example, data processing system 700 also may be a tablet computer, laptop computer, or telephone device in addition to taking the form of a PDA.

The illustrative embodiments provide a computer implemented method, apparatus, and computer usable program code for optimizing control cohorts. Results of a clustering process are used to calculate an objective function for selecting an optimal control cohort. The term "optimal control cohort" refers to a mathematically derived control cohort that is considered mathematically optimized within a plurality of constraints. The term "optimum" and "optimal" similarly refer to determinations of solutions to mathematical functions within given constraints, and do not necessarily refer to the "best possible" outcome or solution.

A cohort is a group of individuals with common characteristics. A control cohort is a group of individuals that share a common characteristic, where the group of individuals of the control cohort do not have a particular hypothesis applied to that control group—relative to other cohorts. For example, if the effects of a learning style teaching method are being studied on a first group of individuals, a control cohort could be a second group of similar individuals who have not received the learning style teaching method. The control cohort is compared against individuals or other cohorts that received the hypothetical test or procedure to statistically prove the efficacy of the hypothesis.

The illustrative embodiments provide an automated method, apparatus, and computer usable program code for selecting individuals for a control cohort. To demonstrate a cause and effect relationship, an experiment must be hypothesis to show that a phenomenon occurs after a certain hypothesis is applied to a subject, and that the phenomenon does not occur in the absence of the hypothesis. A properly designed experiment generally compares the results obtained from a hypothesis cohort against a control cohort, which is selected to be otherwise identical. For most hypothetical treatments, the same number of individuals is selected for both the hypothesis cohort and the control cohort for comparative accuracy. In a different area, a classical example is a drug trial. The cohort or group receiving the drug would be the hypothesis cohort, and the group receiving the placebo would be the control cohort. The difficulty is in selecting the two cohorts to be as near to identical as possible while not introducing human bias.

The illustrative embodiments provide an automated method, apparatus, and computer usable program code for selecting a control cohort. Because the features in the different embodiments are automated, the results are repeatable and introduce reduced human bias. The results are independently verifiable and repeatable in order to scientifically certify hypothetical treatment results.

Figure 8:
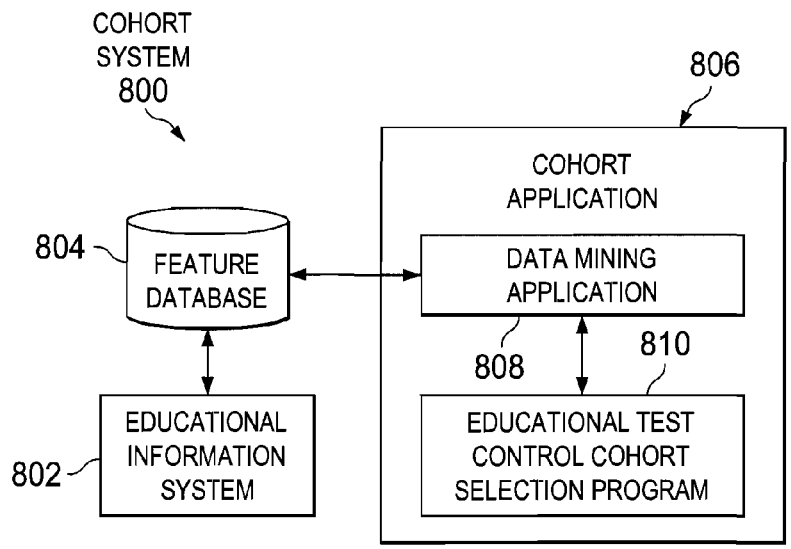
FIG. 8 is a block diagram of a system for generating control cohorts in accordance with an illustrative embodiment.

FIG. 8 is a block diagram of a system for generating control cohorts in accordance with an illustrative embodiment. Cohort system 800 is a system for generating control cohorts. Cohort system 800 includes education information system (EIS) 802, feature database 804, and cohort application 806. Each component of cohort system 800 may be interconnected via a network, such as network 602 of FIG. 6. Cohort application 806 further includes data mining application 808 and educational test control cohort selection program 810.

Education information system 802 is a management system for managing subject data. This data may include, for example, all manner of educational data including those described above. Education information system 802 may be executed by a computing device, such as server 604 or client 610 of FIG. 6. Education information system 802 may also include information about population of subjects as a whole. Such information may disclose subjects who have agreed to participate in educational research but who are not participants in a current study. Education information system 802 includes education records for acquisition, storage, manipulation, and distribution of education information for individuals and organizations. education information system 802 is scalable, allowing information to expand as needed. Education information system 802 may also include information sourced from pre-existing systems, such as test results, past educational studies, and other pre-existing systems.

Feature database 804 is a database in a storage device, such as storage 608 of FIG. 6. Feature database 804 is populated with data from education information system 802. Feature database 804 includes subject data in the form of attributes. Attributes define features, variables, and characteristics of each subject. The most common attributes may include gender, age, test results, and learning style.

Cohort application 806 is a program for selecting control cohorts. Cohort application 806 is executed by a computing device, such as server 604 or client 610 of FIG. 6. Data mining application 808 is a program that provides data mining functionality on feature database 804 and other interconnected databases. In one example, data mining application 808 may be a program, such as DB2 Intelligent Miner produced by International Business Machines Corporation. Data mining is the process of automatically searching large volumes of data for patterns. Data mining may be further defined as the nontrivial extraction of implicit, previously unknown, and potentially useful information from data. Data mining application 808 uses computational techniques from statistics, information theory, machine learning, and pattern recognition.

Particularly, data mining application 808 extracts useful information from feature database 804. Data mining application 808 allows users to select data, analyze data, show patterns, sort data, determine relationships, and generate statistics. Data mining application 808 may be used to cluster records in feature database 804 based on similar attributes. Data mining application 808 searches the records for attributes that most frequently occur in common and groups the related records or members accordingly for display or analysis to the user. This grouping process is referred to as clustering. The results of clustering show the number of detected clusters and the attributes that make up each cluster. Clustering is further described with respect to FIGS. 9A-9B.

For example, data mining application 808 may be able to group subject records to show the effect of a new learning style on overall test taking effectiveness. In an illustrative embodiment, about 35 percent of all subjects at a particular school fail a particular test. Students at the school are subject to a new learning style teaching method as a hypothesis for improving test scores. A statistical control cohort of similarly situated students, in terms of background, could be developed by cohort system 800, using records from historical subjects, subjects from another similar school, and subjects who choose not to participate. Potential features to produce a clustering model could include age, gender, student learning styles, family income, study habits, school location, student home locations, test question analysis, other research studies, and other features.

Data mining application 808 may use a clustering technique or model known as a Kohonen feature map neural network or neural clustering. Kohonen feature maps specify a number of clusters and the maximum number of passes through the data. The number of clusters must be between one and the number of records in the hypothesis cohort. The greater the number of clusters, the better the comparisons can be made between the hypothetical treatment and the control cohort. Clusters are natural groupings of subject records based on the specified features or attributes. For example, a user may request that data mining application 808 generate eight clusters in a maximum of ten passes. The main task of neural clustering is to find a center for each cluster. The center is also called the cluster prototype. Scores are generated based on the distance between each subject record and each of the cluster prototypes. Scores closer to zero have a higher degree of similarity to the cluster prototype. The higher the score, the more dissimilar the record is from the cluster prototype.

All inputs to a Kohonen feature map are scaled from 0.0 to 1.0. In addition, categorical values are converted into numeric codes for presentation to the neural network. Conversions may be made by methods that retain the ordinal order of the input data, such as discrete step functions or bucketing of values. Each record is assigned to a single cluster. However, by using data mining application 808, a user may determine a record's Euclidean dimensional distance for all cluster prototypes.

Clustering is performed for the hypothesis cohort. Educational test control cohort selection program 810 minimizes the sum of the Euclidean distances between the individuals or members in the hypothesis cohorts and the control cohort. Educational test control cohort selection program 810 may incorporate an integer programming model, such as integer programming system 1306 of FIG. 13. This program may be programmed in International Business Machine Corporation products, such as Mathematical Programming System extended (MPSX), the IBM Optimization Subroutine Library, or the open source GNU Linear Programming Kit. The illustrative embodiments minimize the summation of all records/cluster prototype Euclidean distances from the potential control cohort members to select the optimum control cohort.

Figure 9A:
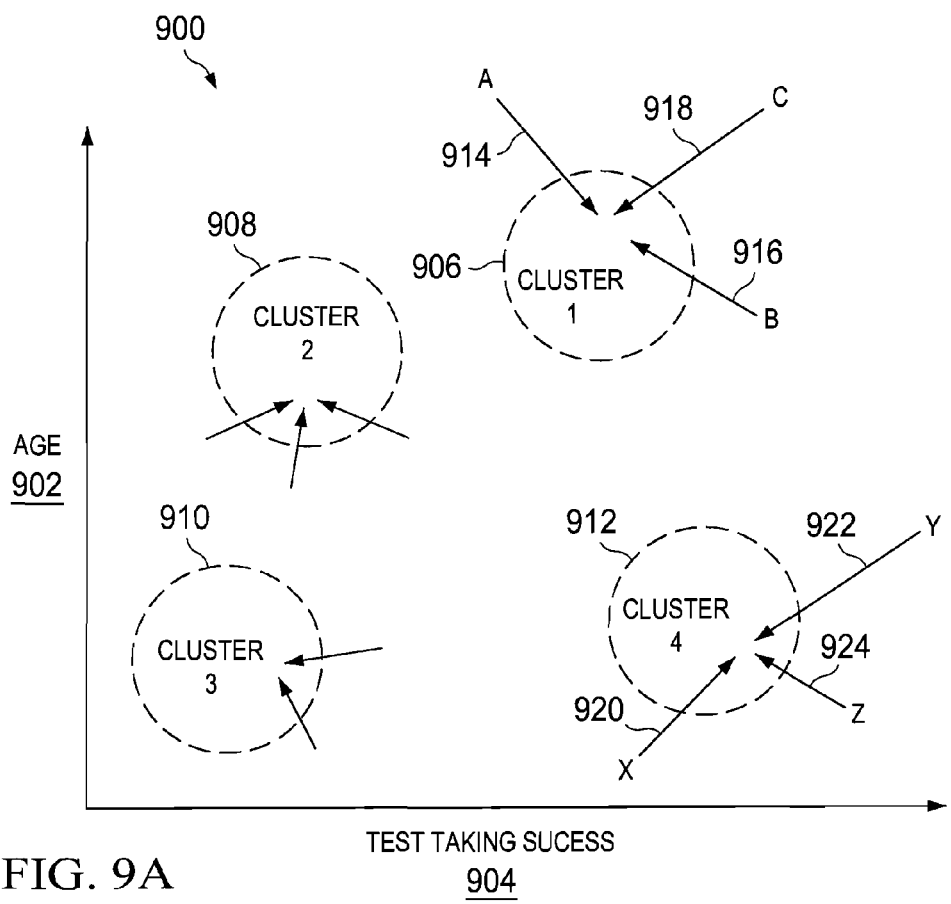
FIGS. 9A-9B are graphical illustrations of clustering in accordance with an illustrative embodiment.
Figure 9B:
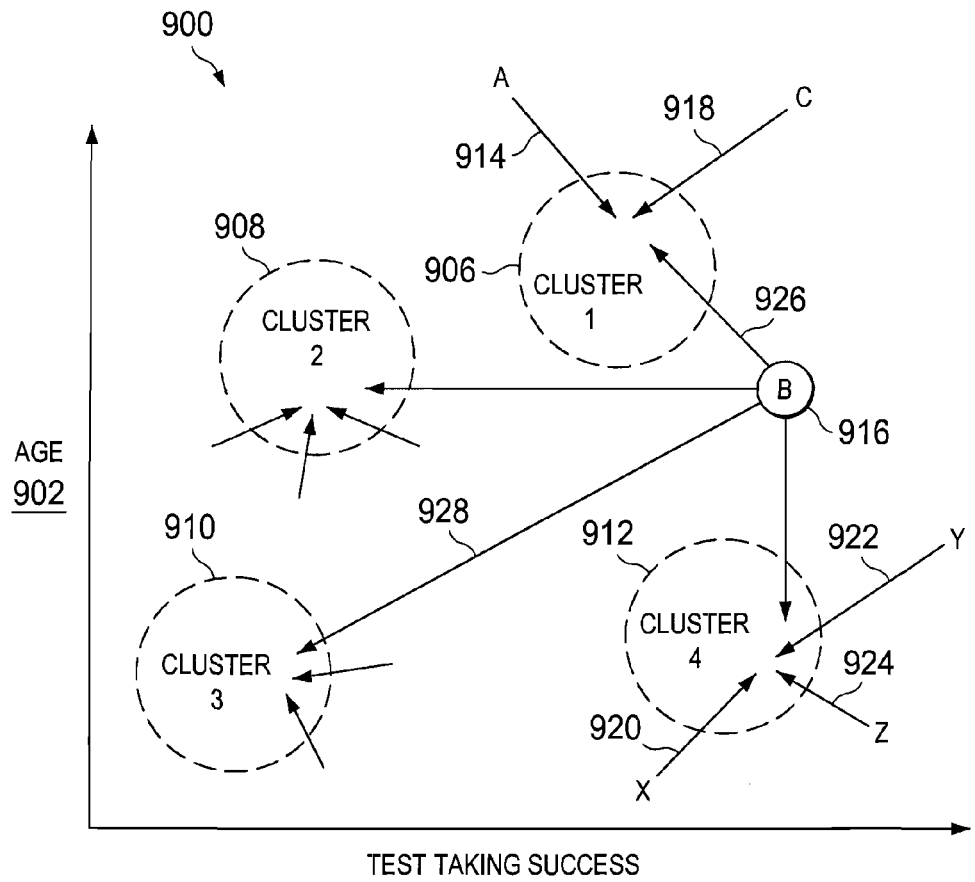

FIGS. 9A-9B are graphical illustrations of clustering in accordance with an illustrative embodiment. Feature map 900 of FIG. 9A is a self-organizing map (SOM) and is a subtype of artificial neural networks. Feature map 900 is trained using unsupervised learning to produce low-dimensional representation of the training samples while preserving the topological properties of the input space. This makes feature map 900 especially useful for visualizing high-dimensional data, including cohorts and clusters.

In one illustrative embodiment, feature map 900 is a Kohonen Feature Map neural network. Feature map 900 uses a process called self-organization to group similar subject records together. Feature map 900 may use various dimensions. In this example, feature map 900 is a two-dimensional feature map including age 902 and test-taking success 904. Feature map 900 may include as many dimensions as there are features, such as those described above. Feature map 900 also includes cluster 1 906, cluster 2 908, cluster 3 910, and cluster 4 912. The clusters are the result of using feature map 900 to group individual subjects based on the features. The clusters are self-grouped local estimates of all data or subjects being analyzed based on competitive learning. When a training sample of subjects is analyzed by data mining application 808 of FIG. 8, each subject is grouped into clusters where the clusters are weighted functions that best represent natural divisions of all subjects based on the specified features.

The user may choose to specify the number of clusters and the maximum number of passes through the data. These parameters control the processing time and the degree of granularity used when subject records are assigned to clusters. The primary task of neural clustering is to find a center for each cluster. The center is called the cluster prototype. For each record in the input subject data set, the neural clustering data mining algorithm computes the cluster prototype that is the closest to the records. For example, subject record A 914, subject record B 916, and subject record C 918 are grouped into cluster 1 906. Additionally, subject record X 920, subject record Y 922, and subject record Z 924 are grouped into cluster 4 912.

FIG. 9B further illustrates how the score for each data record is represented by the Euclidean distance from the cluster prototype. The higher the score, the more dissimilar the record is from the particular cluster prototype. With each pass over the input subject data, the centers are adjusted so that a better quality of the overall clustering model is reached. To score a potential control cohort for each subject record, the Euclidian distance is calculated from each cluster prototype. This score is passed along to an integer programming system in educational test control cohort selection program 810 of FIG. 8. The scoring of each record is further shown by integer programming system 1306 of FIG. 13 below.

For example, subject B 916 is scored into the cluster prototype or center of cluster 1 906, cluster 2 908, cluster 3 910 and cluster 4 912. A Euclidean distance between subject B 916 and cluster 1 906, cluster 2 908, cluster 3 910 and cluster 4 912 is shown. In this example, distance 1 926, separating subject B 916 from cluster 1 906, is the closest. Distance 3

928, separating subject B 916 from cluster 3 910, is the furthest. These distances indicate that cluster 1 906 is the best fit.

Figure 10:
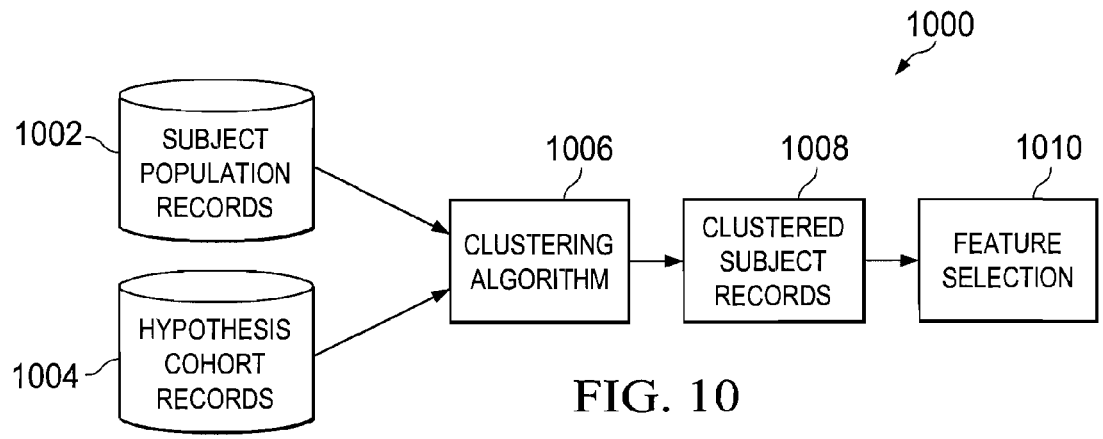
FIG. 10 is a block diagram illustrating information flow for feature selection in accordance with an illustrative embodiment.

FIG. 10 is a block diagram illustrating information flow for feature selection in accordance with an illustrative embodiment. The block diagram of FIG. 10 may be implemented in cohort application 806 of FIG. 8. Feature selection system 1000 includes various components and modules used to perform variable selection. The features selected are the features or variables that have the strongest effect in cluster assignment. For example, family income and learning style may be more important in cluster assignment than subject gender. Feature selection system 1000 may be used to perform step 1402 of FIG. 14. Feature selection system 1000 includes subject population records 1002, hypothesis cohort records 1004, clustering algorithm 1006, clustered subject records 1008, and produces feature selection 1010.

Subject population records 1002 are all records for subjects who are potential control cohort members. Subject population records 1002 and hypothesis cohort records 1004 may be stored in a database or system, such as education information system 802 of FIG. 8. Hypothesis cohort records 1004 are all records for the selected hypothesis cohort. The hypothesis cohort is selected based on the research, study, or other test that is being performed.

Clustering algorithm 1006 uses the features from hypothesis cohort records 1004 to group subject population records in order to form clustered subject records 1008. Clustered subject records 1008 include all subjects grouped according to features of hypothesis cohort records 1004. For example, clustered subject records 1008 may be clustered by a clustering algorithm according to gender, age, physical condition, genetics, disease, disease state, or any other quantifiable, identifiable, or other measurable attribute. Clustered subject records 1008 are clustered using feature selection 1010.

Feature selection 1010 is the features and variables that are most important for a control cohort to mirror the hypothesis cohort. For example, based on the hypothesis cohort, the variables in feature selection 1010 most important to match in the hypothesis cohort may be age 902 and test-taking success 904 as shown in FIGS. 9A and 9B.

Figure 11:
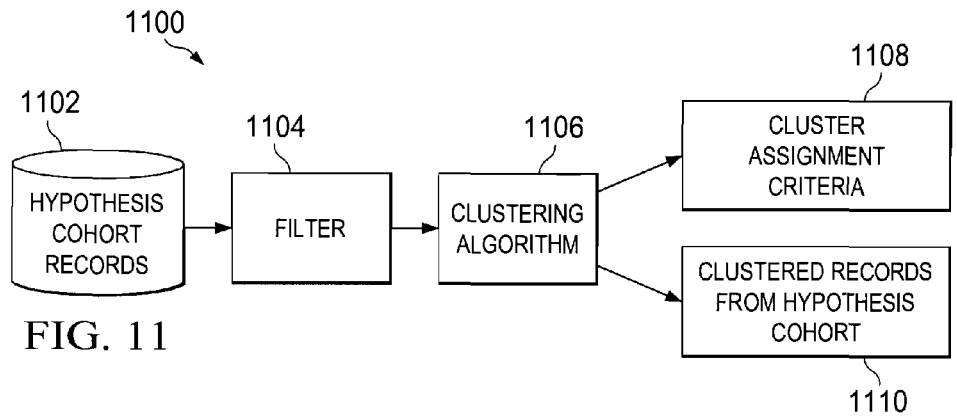
FIG. 11 is a block diagram illustrating information flow for clustering records in accordance with an illustrative embodiment.

FIG. 11 is a block diagram illustrating information flow for clustering records, in accordance with an illustrative embodiment. The block diagram of FIG. 11 may be implemented in cohort application 806 of FIG. 8. Cluster system 1100 includes various components and modules used to cluster assignment criteria and records from the hypothesis cohort. Cluster system 1100 may be used to perform step 1404 of FIG. 14. Cluster system 1100 includes hypothesis cohort records 1102, filter 1104, clustering algorithm 1106, cluster assignment criteria 1108, and clustered records from hypothesis cohort 1110. Filter 1104 is used to eliminate any subject records that have specific factors that would, by themselves, eliminate inclusion of a subject in an educational study. For example, it may be desirable to exclude results from persons with certain learning disabilities from a particular study.

Hypothesis cohort records 1102 are the same as hypothesis cohort records 1004 of FIG. 10. Filter 1104 filters hypothesis cohort records 1102 to include only selected variables such as those selected by feature selection 1010 of FIG. 10.

Clustering algorithm 1106 is similar to clustering algorithm 1006 of FIG. 10. Clustering algorithm 1106 uses the results from filter 1104 to generate cluster assignment criteria 1108 and clustered records from hypothesis cohort 1110. For example, subject A 914, subject B 916, and subject C 918 are assigned into cluster 1 906, all of FIGS. 9A-9B. Clustered records from hypothesis cohort 1110 are the records for subjects in the hypothesis cohort. Every subject is assigned to a primary cluster, and a Euclidean distance to all other clusters is determined. The distance is a distance, such as distance 926, separating subject B 916 and the center or cluster prototype of cluster 1 906 of FIG. 9B. In FIG. 9B, subject B 916 is grouped into the primary cluster of cluster 1 906 because of proximity. Distances to cluster 2 908, cluster 3 910, and cluster 4 912 are also determined.

Figure 12:
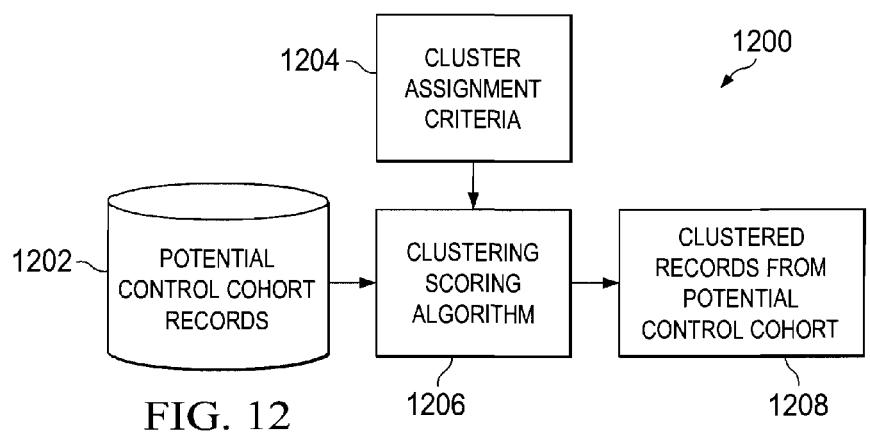
FIG. 12 is a block diagram illustrating information flow for clustering records for a potential control cohort in accordance with an illustrative embodiment.

FIG. 12 is a block diagram illustrating information flow for clustering records for a potential control cohort in accordance with an illustrative embodiment. The block diagram of FIG. 12 may be implemented in cohort application 806 of FIG. 8. Cluster system 1200 includes various components and modules used to cluster potential control cohorts. Cluster system 1200 may be used to perform step 1406 of FIG. 14. Cluster system 1200 includes potential control cohort records 1202, cluster assignment criteria 1204, clustering scoring algorithm 1206, and clustered records from potential control cohort 1208.

Potential control cohort records 1202 are the records from subject population records, such as subject population records 1002 of FIG. 10 that may be selected to be part of the control cohort. For example, potential control cohort records 1202 do not include subject records from the hypothesis cohort. Clustering scoring algorithm 1206 uses cluster assignment criteria 1204 to generate clustered records from potential control cohort 1208. Cluster assignment criteria are the same as cluster assignment criteria 1108 of FIG. 11.

Figure 13:
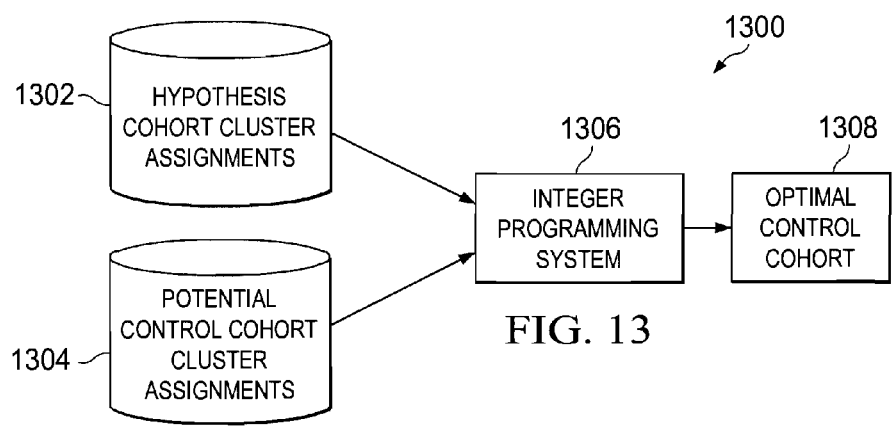
FIG. 13 is a block diagram illustrating information flow for generating an optimal control cohort in accordance with an illustrative embodiment.

FIG. 13 is a block diagram illustrating information flow for generating an optimal control cohort in accordance with an illustrative embodiment. Cluster system 1300 includes various components and modules used to cluster the optimal control cohort. Cluster system 1300 may be used to perform step 1408 of FIG. 14. Cluster system 1300 includes hypothesis cohort cluster assignments 1302, potential control cohort cluster assignments 1304, integer programming system 1306, and optimal control cohort 1308. The cluster assignments indicate the hypothetical treatment and potential control cohort records that have been grouped to that cluster.

0-1 Integer programming is a special case of integer programming where variables are required to be 0 or 1, rather than some arbitrary integer. The illustrative embodiments use integer programming system 1306 because a subject is either in the control group or is not in the control group. Integer programming system 1306 selects the optimum subjects for optimal control cohort 1308 that minimize the differences from the hypothesis cohort.

The objective function of integer programming system 1306 is to minimize the absolute value of the sum of the Euclidian distance of all possible control cohorts compared to the hypothesis cohort cluster prototypes. 0-1 Integer programming typically utilizes many well-known techniques to arrive at the optimum solution in far less time than would be required by complete enumeration. Subject records may be used zero or one time in the control cohort. Optimal control cohort 1308 may be displayed in a graphical format to demonstrate the rank and contribution of each feature/variable for each subject in the control cohort.

FIG. 14 is a flowchart of a process for optimal selection of control cohorts in accordance with an illustrative embodiment. The process of FIG. 14 may be implemented in cohort system 800 of FIG. 8. The process first performs feature input from an education information system (step 1402). In step 1402, the process step moves every potential subject feature data stored in an educational data warehouse, such as education information system 802 of FIG. 8. During step 1402, many more variables are input than will be used by the clustering algorithm. These extra variables will be discarded by feature selection 1010 of FIG. 10.

Some variables, such as age, may need to be included in all clustering models. Other variables are specific to given hypothesis, such as whether a particular learning style works better with boys or girls.

Next, the process clusters hypothesis cohort records (step 1404). Next, the process scores all potential control cohort records to determine the Euclidean distance to all clusters in the hypothesis cohort (step 1406). Step 1404 and 1406 may be performed by data mining application 808 based on data from feature database 804 and education information system 802 all of FIG. 8. Next, the process performs optimal selection of a control cohort (step 1408) with the process terminating thereafter. Step 1408 may be performed by educational test control cohort selection program 810 of FIG. 8. The optimal selection is made based on the score calculated during step 1406. The scoring may also involving weighting. For example, if a record is an equal distance between two clusters, but one cluster has more records, the record may be clustered in the cluster with more records. During step 1408, names, unique identifiers, or encoded indices of individuals in the optimal control cohort are displayed or otherwise provided.

In an illustrative example, there were 2,927 subjects available for the study. The hypothesis cohort reduces the subject number to 2,631 unselected subjects. Next, the 296 subjects of the hypothesis cohort are clustered during step 1404. The clustering model determined during step 1404 is applied to the 2,631 unselected subjects to score potential control cohort records in step 1406. Next, the process selects the best matching 296 subjects for the optimal selection of a control cohort in step 1408. The result is a group of 592 subjects divided between hypothetical treatment and control cohorts who best fit the educational criteria. The results of the control cohort selection are repeatable and defendable.

Thus, the illustrative embodiments provide a computer implemented method, apparatus, and computer usable program code for optimizing control cohorts. The control cohort is automatically selected from subject records to minimize the differences between the hypothesis cohort and the control cohort.

FIG. 15 is a flowchart illustrating execution of a query in a database to establish a probability of an inference based on data contained in the database, in accordance with an illustrative embodiment. The database may contain cohorts and control cohorts, as described above. The process shown in FIG. 15 can be implemented using a central database, such as that described in U.S. application Ser. No. 11/678,959, filed Feb. 26, 2007. The illustrative embodiments can be implemented in a single data processing system or across multiple data processing systems connected by one or more networks. Whether implemented in a single data processing system or across multiple data processing systems, taken together all data processing systems, hardware, software, and networks are together referred-to as a system. The system implements the process.

The process begins as the system receives a query regarding a fact (step 1500). The system establishes the fact as a frame of reference for the query (step 1502). The system then determines a first set of rules for the query according to a second set of rules (step 1504). The system executes the query according to the first set of rules to create a probability of an inference by comparing data in the database (step 1506). The system then stores the probability of the first inference and also stores the inference (step 1508).

The system then performs a recursion process (step 1510). During the recursion process steps 1500 through 1508 are repeated again and again, as each new inference and each new probability becomes a new fact that can be used to generate a new probability and a new inference. Additionally, new facts can be received in central database 1500 during this process, and those new facts also influence the resulting process. Each conclusion or inference generated during the recursion process can be presented to a user, or only the final conclusion or inference made after step 1512 can be presented to a user, or a number of conclusions made prior to step 1512 can be presented to a user.

The system then determines whether the recursion process is complete (step 1512). If recursion is not complete, the process between steps 1500 and 1510 continues. If recursion is complete, the process terminates.

Thus, the illustrative embodiments provide for receiving a query at a database regarding a fact, wherein the first inference is absent from the database. In the illustrative embodiments described herein, the database comprises a plurality of divergent data, which includes a plurality of cohort data. Each datum of the database is conformed to the dimensions of the database. Each datum of the plurality of data has associated metadata and an associated key. The associated metadata comprises data regarding cohorts associated with the corresponding datum, data regarding hierarchies associated with the corresponding datum, data regarding a corresponding source of the datum, and data regarding probabilities associated with integrity, reliability, and importance of each associated datum.

In an illustrative embodiment, the fact is established as a frame of reference for the query. A first set of rules is applied to the query. The first set of rules is determined for the query according to a second set of rules. The first set of rules determines how the plurality of data are to be compared to the fact, and determine a search space for the query. The query is executed to create the probability of the first inference. The probability of the first inference is determined from comparing the plurality of data according to the first set of rules. The probability of the first inference can then be stored for later reference.

Figure 16A:
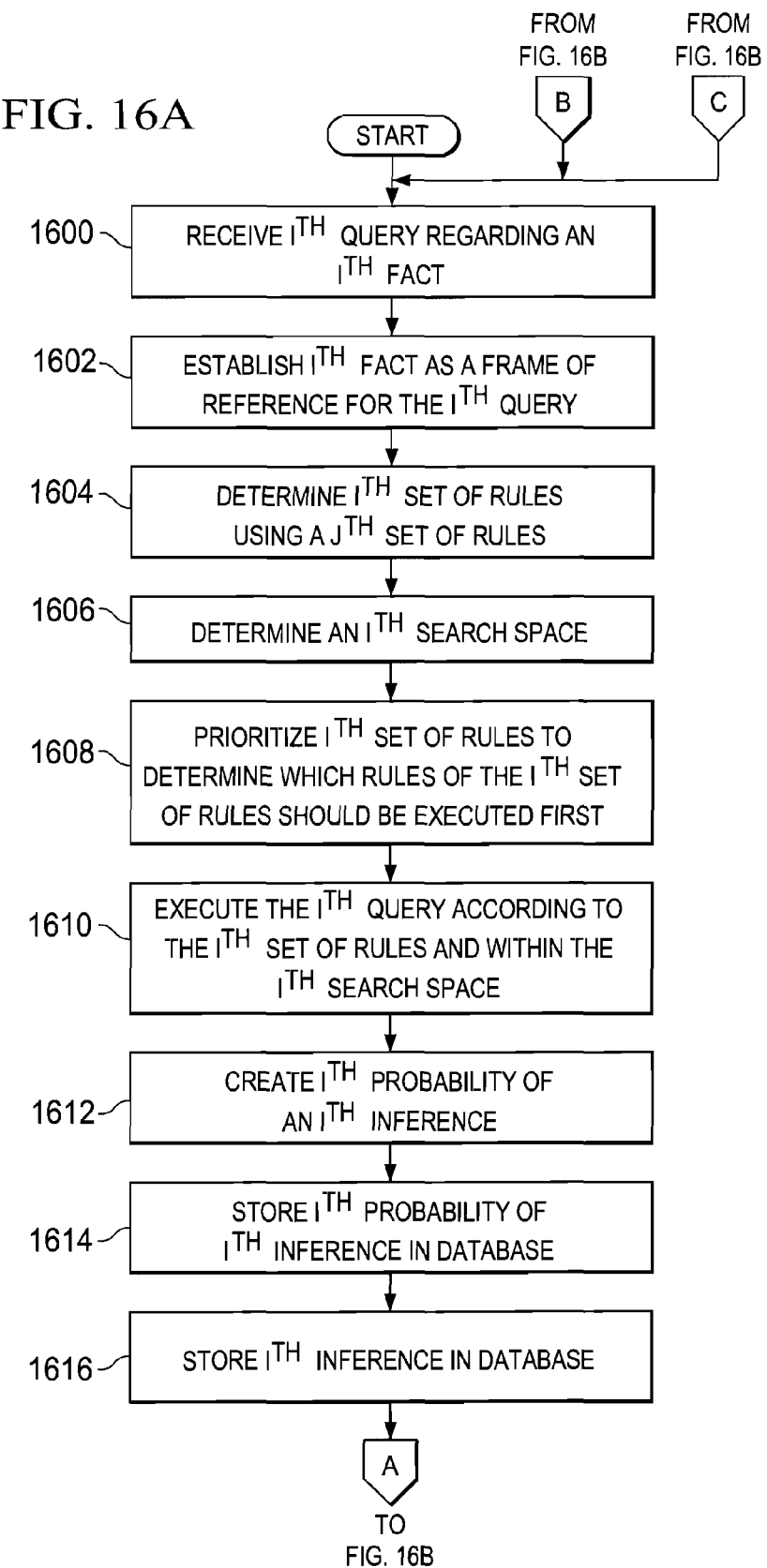
FIGS. 16A and 16B are flowcharts illustrating execution of a query in a database to establish a probability of an inference based on data contained in the database, in accordance with an illustrative embodiment.
Figure 16B:
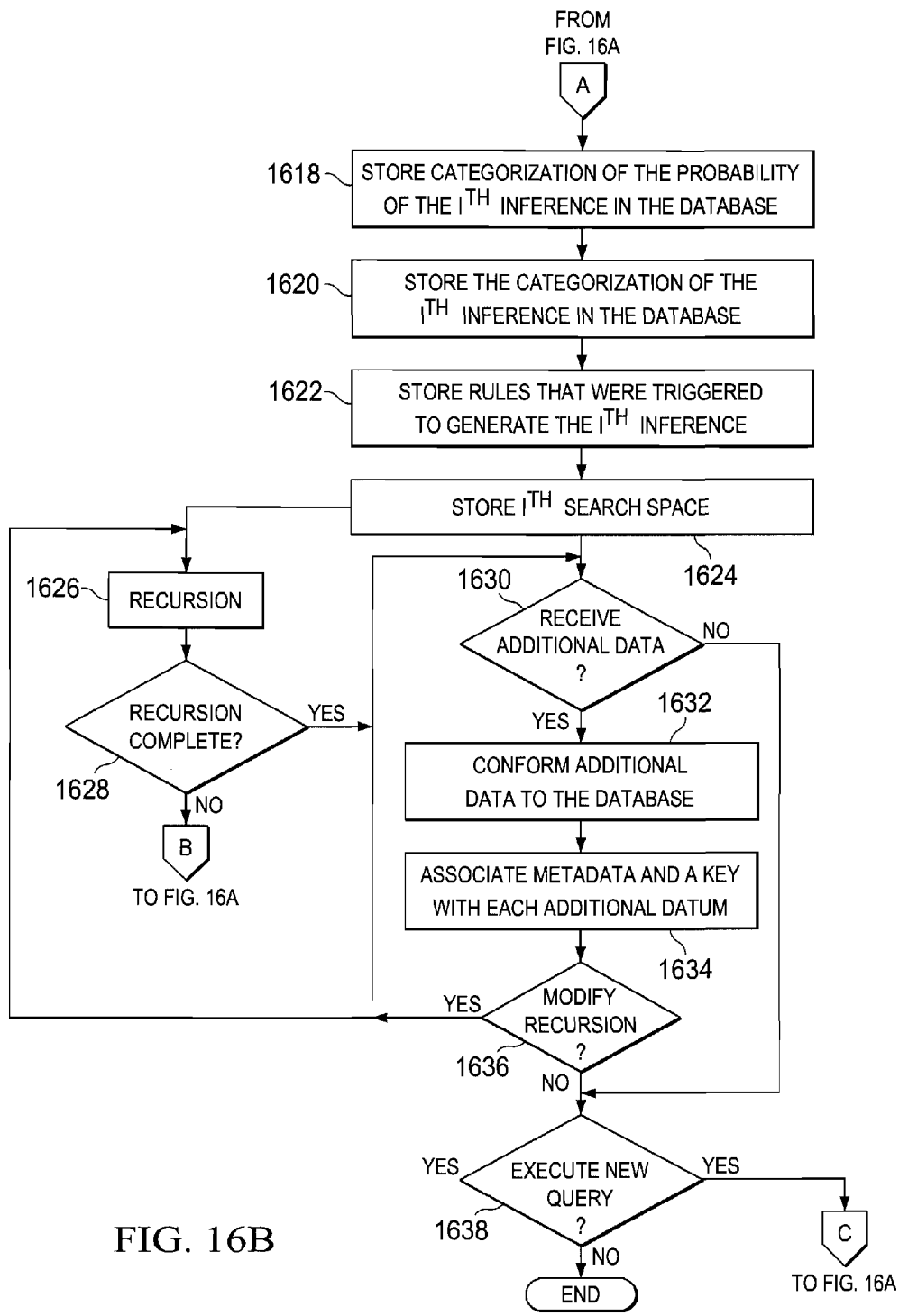

FIGS. 16A and 16B are flowcharts illustrating execution of a query in a database to establish a probability of an inference based on data contained in the database, in accordance with an illustrative embodiment. The database may contain cohorts and control cohorts, as described above. The process shown in FIGS. 16A and 16B can be implemented using a central database, such as that described in U.S. application Ser. No. 11/678,959, filed Feb. 26, 2007. The illustrative embodiments can be implemented in a single data processing system or across multiple data processing systems connected by one or more networks. Whether implemented in a single data processing system or across multiple data processing systems, taken together all data processing systems, hardware, software, and networks are together referred-to as a system. The system implements the process.

The process begins as the system receives an $I^{th}$ query regarding an $I^{th}$ fact (step 1600). The term "$I^{th}$" refers to an integer, beginning with one. The integer reflects how many times a recursion process, referred to below, has been conducted. Thus, for example, when a query is first submitted that query is the $1^{st}$ query. The first recursion is the $2^{nd}$ query. The second recursion is the $3^{rd}$ query, and so forth until recursion I–1 forms the "$I^{th}$" query.

Similarly, but not the same, the $I^{th}$ fact is the fact associated with the $I^{th}$ query. Thus, the $1^{st}$ fact is associated with the $1^{st}$ query, the $2^{nd}$ fact is associated with the $2^{nd}$ query, etc. The $I^{th}$ fact can be the same as previous facts, such as the $I^{th}$-1 fact, the $I^{th}$-2 fact, etc. The $I^{th}$ fact can be a compound fact. A compound fact is a fact that includes multiple sub-facts. The $I^{th}$ fact can start as a single fact and become a compound fact on subsequent recursions or iterations. The $I^{th}$ fact is likely to become a compound fact during recursion, as additional information is added to the central database during each recursion.

After receiving the $I^{th}$ query, the system establishes the $I^{th}$ fact as a frame of reference for the $I^{th}$ query (step 1602). A frame of reference is an anchor datum or set of data that is used to limit which data are searched in the central database, that is defines the search space. The frame of reference also is used to determine to what rules the searched data will be subject. Thus, when the query is executed, sufficient processing power will be available to make inferences.

The system then determines an $I^{th}$ set of rules using a $J^{th}$ set of rules (step 1604). In other words, a different set of rules is used to determine the set of rules that are actually applied to the $I^{th}$ query. The term "$J^{th}$" refers to an integer, starting with one, wherein J=1 is the first iteration of the recursion process and I−1 is the $J^{th}$ iteration of the recursion process. The $J^{th}$ set of rules may or may not change from the previous set, such that $J^{th}$−1 set of rules may or may not be the same as the $J^{th}$ set of rules. The term $J^{th}$ set of rules refers to the set of rules that establishes the search rules, which are the $I^{th}$ set of rules. The $J^{th}$ set of rules is used to determine the $I^{th}$ set of rules.

The system then determines an $I^{th}$ search space (step 1606). The $I^{th}$ search space is the search space for the $I^{th}$ iteration. A search space is the portion of a database, or a subset of data within a database, that is to be searched.

The system then prioritizes the $I^{th}$ set of rules, determined during step 1604, in order to determine which rules of the $I^{th}$ set of rules should be executed first (step 1608). Additionally, the system can prioritize the remaining rules in the $I^{th}$ set of rules. Again, because computing resources are not infinite, those rules that are most likely to produce useful or interesting results are executed first.

After performing steps 1600 through 1606, the system executes the $I^{th}$ query according to the $I^{th}$ set of rules and within the $I^{th}$ search space (step 1610). As a result, the system creates an $I^{th}$ probability of an $I^{th}$ inference (step 1612). As described above, the inference is a conclusion based on a comparison of facts within the central database. The probability of the inference is the likelihood that the inference is true, or alternatively the probability that the inference is false. The $I^{th}$ probability and the $I^{th}$ inference need not be the same as the previous inference and probability in the recursion process, or one value could change but not the other.

For example, as a result of the recursion process the $I^{th}$ inference might be the same as the previous iteration in the recursion process, but the $I^{th}$ probability could increase or decrease over the previous iteration in the recursion process. In contrast, the $I^{th}$ inference can be completely different than the inference created in the previous iteration of the recursion process, with a probability that is either the same or different than the probability generated in the previous iteration of the recursion process.

Next, the system stores the $I^{th}$ probability of the $I^{th}$ inference as an additional datum in the central database (step 1614). Similarly, the system stores the $I^{th}$ inference in the central database (step 1616), stores a categorization of the probability of the $I^{th}$ inference in the central database (step 1618), stores the categorization of the $I^{th}$ inference in the database (step 1620), stores the rules that were triggered in the $I^{th}$ set of rules to generate the $I^{th}$ inference (step 1622), and stores the $I^{th}$ search space (step 1624). Additional information generated as a result of executing the query can also be stored at this time. All of the information stored in steps 1614 through 1624, and possibly in additional storage steps for additional information, can change how the system performs, how the system behaves, and can change the result during each iteration.

The process then follows two paths simultaneously. First, the system performs a recursion process (step 1626) in which steps 1600 through 1624 are continually performed, as described above. Second, the system determines whether additional data is received (step 1630).

Additionally, after each recursion, the system determines whether the recursion is complete (step 1628). The process of recursion is complete when a threshold is met. In one example, a threshold is a probability of an inference. When the probability of an inference decreases below a particular number, the recursion is complete and is made to stop. In another example, a threshold is a number of recursions. Once the given number of recursions is met, the process of recursion stops. Other thresholds can also be used. If the process of recursion is not complete, then recursion continues, beginning again with step 1600.

If the process of recursion is complete, then the process returns to step 1630. Thus, the system determines whether additional data is received at step 1630 during the recursion process in steps 1600 through 1624 and after the recursion process is completed at step 1628. If additional data is received, then the system conforms the additional data to the database (step 1632), as described with respect to FIG. 8. The system also associates metadata and a key with each additional datum (step 1634). A key uniquely identifies an individual datum. A key can be any unique identifier, such as a series of numbers, alphanumeric characters, other characters, or other methods of uniquely identifying objects.

If the system determines that additional data has not been received at step 1630, or after associating metadata and a key with each additional datum in step 1634, then the system determines whether to modify the recursion process (step 1636). Modification of the recursion process can include determining new sets of rules, expanding the search space, performing additional recursions after recursions were completed at step 1628, or continuing the recursion process.

In response to a positive determination to modify the recursion process at step 1636, the system again repeats the determination whether additional data has been received at step 1630 and also performs additional recursions from steps 1600 through 1624, as described with respect to step 1626.

Otherwise, in response to a negative determination to modify the recursion process at step 1636, the system determines whether to execute a new query (step 1638). The system can decide to execute a new query based on an inference derived at step 1612, or can execute a new query based on a prompt or entry by a user. If the system executes a new query, then the system can optionally continue recursion at step 1626, begin a new query recursion process at step 1600, or perform both simultaneously. Thus, multiple query recursion processes can occur at the same time. However, if no new query is to be executed at step 1638, then the process terminates.

Thus, the illustrative embodiments provide for using a centralized database for managing information. The centralized database can be used to derive probabilities of inferences based on comparison of data within the centralized database according to a set of search rules. The centralized database can further be used to prioritize the probabilities of the inferences and present the probabilities of the inferences to a user according to the prioritization. The search rules are, themselves, determined by a set of determination rules. Thus, the system prevents the entirety of the data in the database from being compared in every possible combination, in order that limited computing resources can execute desired queries.

The system is particularly useful in the context of educational study analysis where potentially vast quantities of data regarding millions of students, teachers, and tests are to be sifted. The system is capable of taking in vast quantities of divergent data and accurately producing probabilities of inferences based on the divergent data. If possible, as much information regarding each datum is stored as metadata associated with the corresponding datum. Thus, for example, the source, channel, time of creation, time of modification, time of ownership, ownership, Internet address, whether data is encrypted, encryption methods, and many other forms of information can be stored as metadata associated with each datum. In addition, the metadata associated with each datum is fully searchable and is part of the database search during execution of a query.

Combined, the cohorts, control cohorts, and probabilistic generation of inferences described herein allow for a powerful method of performing educational outcome analysis. Combined, the illustrative embodiments support the longitudinal analysis of various testing methods and learning styles. Such longitudinal analyses support the processing of information known to a high degree of validity based on derived probabilities.

Potential outcomes include the analysis of long term outcomes measured across multiple diverse metrics of inputs, such as students, teachers, curricula, resources, legislation, parental involvement, family income of student families, school geographical location, learning styles, teaching styles, race, gender, ethnicity, religious orientation, and possibly many other factors. Additionally, millions of students and teachers can be included in any given study over multiple decades, thereby vastly increasing the applicability and validity of any given hypothesis testing.

This approach creates a much deeper, qualitatively superior analysis of educational outcomes and hypothesis testing relative to older, simple, outcome-driven statistical methods. Thus, the illustrative embodiments would allow for the creation of superior education policies based on a vast storehouse of empirical data, rather on limited statistical studies. Superior education policies are those education policies that result in more effective student learning and in higher rates of life success in students after students graduate from school.

An illustrative method of performing analysis on a plurality of data stored in a database is described below. The illustrative method can be implemented in a single data processing system or across multiple data processing systems connected by one or more networks, such as those shown in FIG. 1, FIG. 2, FIG. 6, and FIG. 7. Whether implemented in a single data processing system or across multiple data processing systems, taken together all data processing systems, hardware, software, and networks are together referred-to as a system. The system implements the process.

In an illustrative method, a first cohort is generated from the plurality of data. An optimal control cohort is generated from the plurality of data. Generating is performed based on the first cohort and at least one constraint, and a mathematical process is used to derive the optimal control cohort. A first inference is generated based on a comparison of the first cohort to the optimal control cohort, wherein the first inference is absent from the database. In an illustrative example, the first inference is stored.

This method can be supplemented by a number of additional steps. A query can be received at the database regarding a fact. The fact is established as a frame of reference for the query based on the first cohort and based on the optimal control cohort. A first set of rules is applied to the query, wherein the first set of rules are determined for the query according to a second set of rules. The first set of rules determines how the plurality of data are to be compared to the fact. The first set of rules also determines a search space for the query. The query is executed to generate a second inference. The second inference is determined from comparing the plurality of data according to the first set of rules. In an illustrative embodiment the second inference is stored.

The inferences can refer to different items and can be based on a variety of bases. For example, the second inference can either validate the first inference or be based on the first inference. In another example, the second inference further comprises one of a probability of the second inference being correct or a probability that the first inference is correct. In still another example, the first inference further comprises a probability of the first inference being correct. The first inference can relate to a study on educational outcomes. The second inference can relate to a study on educational outcomes.

In an illustrative embodiment the database can have the following structure. The database can be a plurality of divergent data, wherein the plurality of divergent data includes a plurality of cohort data, wherein each datum of the database is conformed to the dimensions of the database, wherein each datum of the plurality of data has associated metadata and an associated key, wherein the associated metadata comprises data regarding cohorts associated with the corresponding datum, data regarding hierarchies associated with the corresponding datum, data regarding a corresponding source of the datum, and data regarding probabilities associated with integrity, reliability, and importance of each associated datum.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for performing analysis on a plurality of data stored in a database, the computer implemented method comprising:
   generating a first cohort from the plurality of data;
   generating an optimal control cohort from the plurality of data, wherein generating is performed based on the first cohort and at least one constraint, and wherein a mathematical process is used to derive the optimal control cohort;
   generating a first inference based on a comparison of the first cohort to the optimal control cohort, wherein the first inference is absent from the database; storing the first inference; receiving an $I^{th}$ query at the database regarding an $I^{th}$ fact, wherein I is an integer reflecting how many times a recursion process has been conducted, wherein the $I^{th}$ fact becomes a compound fact that includes multiple sub-facts on a subsequent iteration of the recursion process;
   establishing the $I^{th}$ fact as a frame of reference for the $I^{th}$ query based on the first cohort and based on the optimal control cohort;
   applying an $I^{th}$ set of rules to the $I^{th}$ query, wherein the $I^{th}$ set of rules is determined for the $I^{th}$ query according to a $J^{th}$ set of rules, wherein J is equal to I−1, wherein the $I^{th}$ set of rules determines how the plurality of data are to be compared to the $I^{th}$ fact, and wherein the first set of rules determines an $I^{th}$ search space for the $I^{th}$ query;
   executing the $I^{th}$ query to generate a second inference, wherein the second inference is determined from comparing the plurality of data according to the $I^{th}$ set of rules; storing the second inference; and
   evaluating a hypothesis within a research study based on the first cohort, the optimal control cohort, the first inference, and the second inference performed by a processor.

2. The computer implemented method of claim 1 wherein the second inference either validates the first inference or is based on the first inference.

3. The computer implemented method of claim 1 wherein the second inference further comprises one of a probability of the second inference being correct or a probability that the first inference is correct.

4. The computer implemented method of claim 1 wherein the first inference further comprises a probability of the first inference being correct.

5. The computer implemented method of claim 1 wherein the database comprises a plurality of divergent data, wherein the plurality of divergent data includes a plurality of cohort data, wherein each datum of the database is conformed to the dimensions of the database, wherein each datum of the plurality of data has associated metadata and an associated key, wherein the associated metadata comprises data regarding cohorts associated with the corresponding datum, data regarding hierarchies associated with the corresponding datum, data regarding a corresponding source of the datum, and data regarding probabilities associated with integrity, reliability, and importance of each associated datum.

6. The computer implemented method of claim 1 wherein the first inference relates to a study on educational outcomes.

7. The computer implemented method of claim 1 wherein the second inference relates to a study on educational outcomes.

8. A non-transitory computer usable storage medium having computer usable program product encoded thereon for performing analysis on a plurality of data stored in a database, the computer program product including:
   computer usable program code for generating a first cohort from the plurality of data;
   computer usable program code for generating an optimal control cohort from the plurality of data, wherein generating is performed based on the first cohort and at least one constraint, and wherein a mathematical process is used to derive the optimal control cohort;
   computer usable program code for generating a first inference based on a comparison of the first cohort to the optimal control cohort, wherein the first inference is absent from the database; and
   storing the first inference; computer usable program code for receiving an $I^{th}$ query at the database regarding an $I^{th}$ fact, wherein I is an integer reflecting how many times a recursion process has been conducted, wherein the $I^{th}$ fact becomes a compound fact that includes multiple sub-facts on a subsequent iteration of the recursion process;
   computer usable program code for establishing the $I^{th}$ fact as a frame of reference for the $I^{th}$ query based on the first cohort and based on the optimal control cohort;
   computer usable program code for applying an $I^{th}$ set of rules to the $I^{th}$ query, wherein the $I^{th}$ set of rules is determined for the $I^{th}$ query according to a $J^{th}$ set of rules, wherein J is equal to I−1, wherein the $I^{th}$ set of rules determines how the plurality of data are to be compared to the $I^{th}$ fact, and wherein the first set of rules determines an $I^{th}$ search space for the $I^{th}$ query;
   computer usable program code for executing the $I^{th}$ query to generate a second inference, wherein the second inference is determined from comparing the plurality of data according to the $I^{th}$ set of rules;
   storing the second inference; and
   evaluating a hypothesis within a research study based on the first cohort, the optimal control cohort, the first inference, and the second inference.

9. The computer usable medium of claim 8 wherein the second inference either validates the first inference or is based on the first inference.

10. The computer usable medium of claim 8 wherein the second inference further comprises one of a probability of the second inference being correct or a probability that the first inference is correct.

11. The computer usable medium of claim 8 wherein the first inference further comprises a probability of the first inference being correct.

12. The computer usable medium of claim 8 wherein the first inference and the second inference relate to a study on educational outcomes.

13. A data processing system comprising:
a bus;
at least one processor coupled to the bus;
a computer usable medium coupled to the bus, wherein the computer usable storage medium contains a set of instructions for performing analysis on a plurality of data stored in a database,
wherein the at least one processor is adapted to carry out the set of instructions to: generate a first cohort from the plurality of data;
generate an optimal control cohort from the plurality of data, wherein generating is performed based on the first cohort and at least one constraint, and wherein a mathematical process is used to derive the optimal control cohort; and
generate a first inference based on a comparison of the first cohort to the optimal control cohort, wherein the first inference is absent from the database;
receive an $I^{th}$ query at the database regarding an $I^{th}$ fact, wherein I is an integer reflecting how many times a recursion process has been conducted, wherein the $I^{th}$ fact becomes a compound fact that includes multiple sub-facts on a subsequent iteration of the recursion process;
establish the $I^{th}$ fact as a frame of reference for the $I^{th}$ query based on the first cohort and based on the optimal control cohort;
apply an $I^{th}$ set of rules to the $I^{th}$ query, wherein the $I^{th}$ set of rules is determined for the $I^{th}$ query according to a $J^{th}$ set of rules, wherein J is equal to I−1, wherein the $I^{th}$ set of rules determines how the plurality of data are to be compared to the $I^{th}$ fact, and wherein the first set of rules determines an $I^{th}$ search space for the $I^{th}$ query;
execute the $I^{th}$ query to generate a second inference, wherein the second inference is determined from comparing the plurality of data according to the $I^{th}$ set of rules;
store the second inference; and
evaluating a hypothesis within a research study based on the first cohort, the optimal control cohort, the first inference, and the second inference.

14. The data processing system of claim 13 wherein the second inference either validates the first inference or is based on the first inference.

15. The data processing system of claim 14 wherein the second inference further comprises one of a probability of the second inference being correct or a probability that the first inference is correct.

16. The data processing system of claim 13 wherein the first inference further comprises a probability of the first inference being correct.

17. The data processing system of claim 13 wherein the first inference and the second inference relate to a study on educational outcomes.

* * * * *